United States Patent
Kaechi

(10) Patent No.: US 7,840,206 B2
(45) Date of Patent: Nov. 23, 2010

(54) WIRELESS COMMUNICATION SYSTEM AND AUTHENTICATION METHOD AND COMMUNICATION CONTROL METHOD IN WIRELESS COMMUNICATION SYSTEM

(75) Inventor: Shuya Kaechi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1085 days.

(21) Appl. No.: 11/542,132

(22) Filed: Oct. 4, 2006

(65) Prior Publication Data

US 2007/0076875 A1 Apr. 5, 2007

(30) Foreign Application Priority Data

Oct. 5, 2005 (JP) ............................ 2005-293001

(51) Int. Cl.
*H04M 1/66* (2006.01)

(52) U.S. Cl. .................. 455/411; 455/405; 455/514; 455/517; 455/416; 380/247; 713/188; 726/4; 726/28; 709/205; 709/228; 379/202.01; 379/207.01; 379/207.02

(58) Field of Classification Search ................. 455/411, 455/405, 514, 517, 416; 380/247; 713/168; 726/4, 28; 709/205, 228; 379/202.01, 207.01, 379/207.02
See application file for complete search history.

(56) References Cited

U.S. PATENT DOCUMENTS

| | | | | |
|---|---|---|---|---|
| 6,940,960 B2 * | 9/2005 | Benco et al. | ............ | 379/202.01 |
| 2002/0147819 A1 * | 10/2002 | Miyakoshi et al. | .......... | 709/228 |
| 2003/0054844 A1 * | 3/2003 | Anvekar et al. | ............. | 455/466 |
| 2004/0047461 A1 * | 3/2004 | Weisman et al. | ....... | 379/202.01 |
| 2008/0200159 A1 * | 8/2008 | Lai | ............................. | 455/416 |
| 2009/0209242 A1 * | 8/2009 | Chin | ........................... | 455/416 |

FOREIGN PATENT DOCUMENTS

| | | |
|---|---|---|
| JP | 2002-359623 | 12/2002 |
| JP | 2004-178187 | 6/2004 |

* cited by examiner

*Primary Examiner*—Rafael Pérez-Gutiérrez
*Assistant Examiner*—Nimesh Patel
(74) *Attorney, Agent, or Firm*—Fitzpatrick, Cella, Harper & Scinto

(57) ABSTRACT

A wireless communication apparatus which wirelessly communicates with other communication apparatus or apparatuses, comprises a setting unit that sets a maximum number of other communication apparatus or apparatuses up to which the wireless communication apparatus authenticates to perform wireless communication, a storage unit that stores said maximum number set by said setting unit, and an authentication unit that authenticates other communication apparatus or apparatuses within said maximum number stored in said storage unit.

7 Claims, 20 Drawing Sheets

WIRELESS COMMUNICATION SYSTEM AND AUTHENTICATION METHOD AND COMMUNICATION CONTROL METHOD IN WIRELESS COMMUNICATION SYSTEM

BACKGROUND OF THE INVENTION

1. Field of the Invention

The present invention relates to authentication method and communication control method in a wireless communication system comprising a plurality of wireless communication apparatuses.

2. Description of the Related Art

Recently, data communication and control are performed between various types of information devices, for example information terminals such as cellular phones, PDAs (Personal Digital Assistants), personal computers and peripheral devices of personal computers such as printers. In the data communication and control between the information devices, use of wireless communication connection has been sharply increased. Further, in addition to the above described information devices, various devices are being adapted to support wireless communication function, for example image sensing apparatuses such as digital cameras, home electric appliances and accessories. On the other hand, wireless use of USB (Universal Serial Bus), which has been widespread as a wired communication connection method, is promoted.

Wireless communication connection standards which are now generally used include Bluetooth (registered trademark), IEEE 802.11 standard and so-called Wireless LAN, etc. In Bluetooth (registered trademark), an ad hoc mode which is suitable to peer-to-peer connection is mainly used, it is possible to form piconet for network connection of a plurality of information devices in an ad hoc mode. In IEEE 802.11 standard, there are the ad hoc mode which is suitable to peer-to-peer connection, and an infrastructure mode which is suitable to connection to existing LANs.

In performing wireless communication connection and wireless data communication by wireless communication apparatuses, a procedure of authentication is often performed so as not to connect to unspecified apparatuses or unintended apparatuses. In the authentication, a PIN (personal Identification Number) code or an ESSID (Extended Service Set Identifier) is exchanged between the wireless communication apparatuses as one of authentication information. Additionally, a WEP key (Wired Equivalent Privacy Key) or the like may be used. Two specific wireless communication apparatuses, which have exchanged the above described authentication information, make one-to-one correspondence using the authentication information to ensure authentication security of wireless communication.

The authentication information must not be disclosed to a third party. If the authentication information leaks to a third party, the third party can access documents, address books, electronic mails, personal information, image data and so on, which are stored in the apparatuses, using the leaked authentication information. In addition, a wireless communication system, a billing system or a printing system can be used by the third party without proper authentication. Under these circumstances, security measures for wireless communication apparatuses receive attention.

Several methods of inputting authentication information for mutual authentication of wireless communication apparatuses are provided: for example, a method of manual input by users, a method of inserting SIM (Subscriber Identify Module) cards into the apparatuses, a method for authentication using infrared communication and a method for authentication using connection cables. In addition, there is a method in which two wireless communication units are provided in the apparatus and authentication is performed with one of the wireless communication units, for example.

The authentication information, such as communication parameters and address identifiers, example of which are the PIN code, the ESSID or the WEP key, is stored in storage units in both wireless communication apparatuses after mutual authentication of the wireless communication apparatuses is completed. When data communication is performed, a wireless data communication path is established using the stored authentication information.

The following method is proposed as a method for authentication of wireless communication apparatuses with security measures. A first communication device and a second communication device, which have a first communication part capable of wireless communication and a second communication part different from the first communication part, mutually connect their second communication parts with a cable to determine communication parameters for wireless communication between the two devices. In this way, setting of the communication parameters required for wireless communication by the user can be eliminated (see Japanese Patent Laid-Open No. 2002-359623, for example).

In addition, for wireless communication between two communication apparatuses which are a digital camera and a communication partner device, the following method is proposed. First, the communication partner device displays on an image display unit bar code information used for attaining permission of communication, and the digital camera obtains and analyzes the bar code information displayed on the image display unit of the communication partner device by an image sensing element. Then, the digital camera stores the analyzed information as an authentication password for wireless communication with the communication partner device (see Japanese Patent Laid-Open No. 2004-178187, for example).

The authentication information associating the specific two wireless communication apparatuses with each other has a high-security strength as its word length is random and long. However, when the user manually inputs the information, the operation is cumbersome for the user. Therefore, the authentication information which is manually input by the user has often a short word length and therefore the code is easy to guess by the third party. In addition, in the method for authentication with infrared communication, it is inconvenient that the user has to perform cumbersome operations or care about the narrow directivity. Further, in the method described in Japanese Patent Laid-Open No. 2002-359623, it is necessary to connect devices to each other with a cable, which is also cumbersome.

In the method disclosed in Japanese Patent Laid-Open No. 2004-178187, wire connection with the communication partner device is not required, which allows easy authentication. However, management of the authentication information after the authentication is performed and communication control in the case of a plurality of wireless communication apparatuses being authenticated with each other are not considered. Therefore, it is difficult to practically use the method.

In particular, if too many communication apparatuses are allowed to communicate with a communication apparatus, the occupation time of the communication apparatus by other communication apparatuses is too long.

As described above, in the conventional authentication method and communication control method of wireless communication apparatuses, the authentication information such as communication parameters and address identifiers cannot easily set. Therefore, a system such as a wireless communication system or a printing system which is easy to use by the user cannot be provided.

SUMMARY OF THE INVENTION

The present invention has been made in consideration of the above situation, and has as its first object to simplify management of authentication information in wireless communication between a plurality of wireless communication apparatuses.

Further, it is a second object to enable easy setting of the authentication information in authentication between a plurality of wireless communication apparatuses.

According to the present invention, the foregoing object is attained by providing a wireless communication apparatus which wirelessly communicates with other communication apparatus or apparatuses, comprises: a setting unit that sets a maximum number of other communication apparatus or apparatuses up to which the wireless communication apparatus authenticates to perform wireless communication; a storage unit that stores the maximum number set by the setting unit; and an authentication unit that authenticates other communication apparatus or apparatuses within the maximum number stored in the storage unit.

According to the present invention, the foregoing object is also attained by providing a authentication method for a wireless communication apparatus which wirelessly communicates with other communication apparatus or apparatuses, comprising: setting a maximum number of other communication apparatus or apparatuses up to which the wireless communication apparatus authenticates to perform wireless communication; storing the set maximum number; and authenticating other communication apparatus or apparatuses within the stored maximum number.

The foregoing object is also attained by providing an authentication method in a plurality of wireless communication apparatuses which communicate with each other, the method comprising the steps of: setting a maximum number of other wireless communication apparatus or apparatuses up to which each wireless communication apparatus authenticates; storing the set maximum number in each wireless communication apparatus; and authenticating other wireless communication apparatus or apparatuses within the stored maximum number.

Further, the foregoing object is also attained by providing a wireless communication control method in a plurality of wireless communication apparatuses which authenticate other wireless communication apparatus or apparatuses by the authentication method according to claim 1, the method comprising the steps of: accepting a request for wireless communication; and performing wireless communication if the requesting wireless communication apparatus is an authenticated wireless communication apparatus.

Furthermore, the foregoing object is also attained by providing a wireless communication control method in a first wireless communication apparatus which authenticates other wireless communication apparatus or apparatuses by the above described authentication method, the method comprising the steps of: accepting a request for wireless communication; determining whether authentication information included in the request matches with authentication information stored in the first wireless communication apparatus; and performing wireless communication with the requesting wireless communication apparatus if a result of the determination is affirmative.

Further, the foregoing object is also attained by providing a wireless communication system comprising a plurality of wireless communication apparatuses which communicate with each other, wherein each wireless communication apparatus comprises: a setting unit that sets a maximum number of other wireless communication apparatus or apparatuses up to which each wireless communication apparatus authenticates; a storage unit that stores the set maximum number in each wireless communication apparatus; and an authentication unit that authenticates other wireless communication apparatus or apparatuses within the stored maximum number.

Further features of the present invention will become apparent from the following description of exemplary embodiments with reference to the attached drawings.

DESCRIPTION OF THE EMBODIMENTS

Preferred embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

Figure 1:
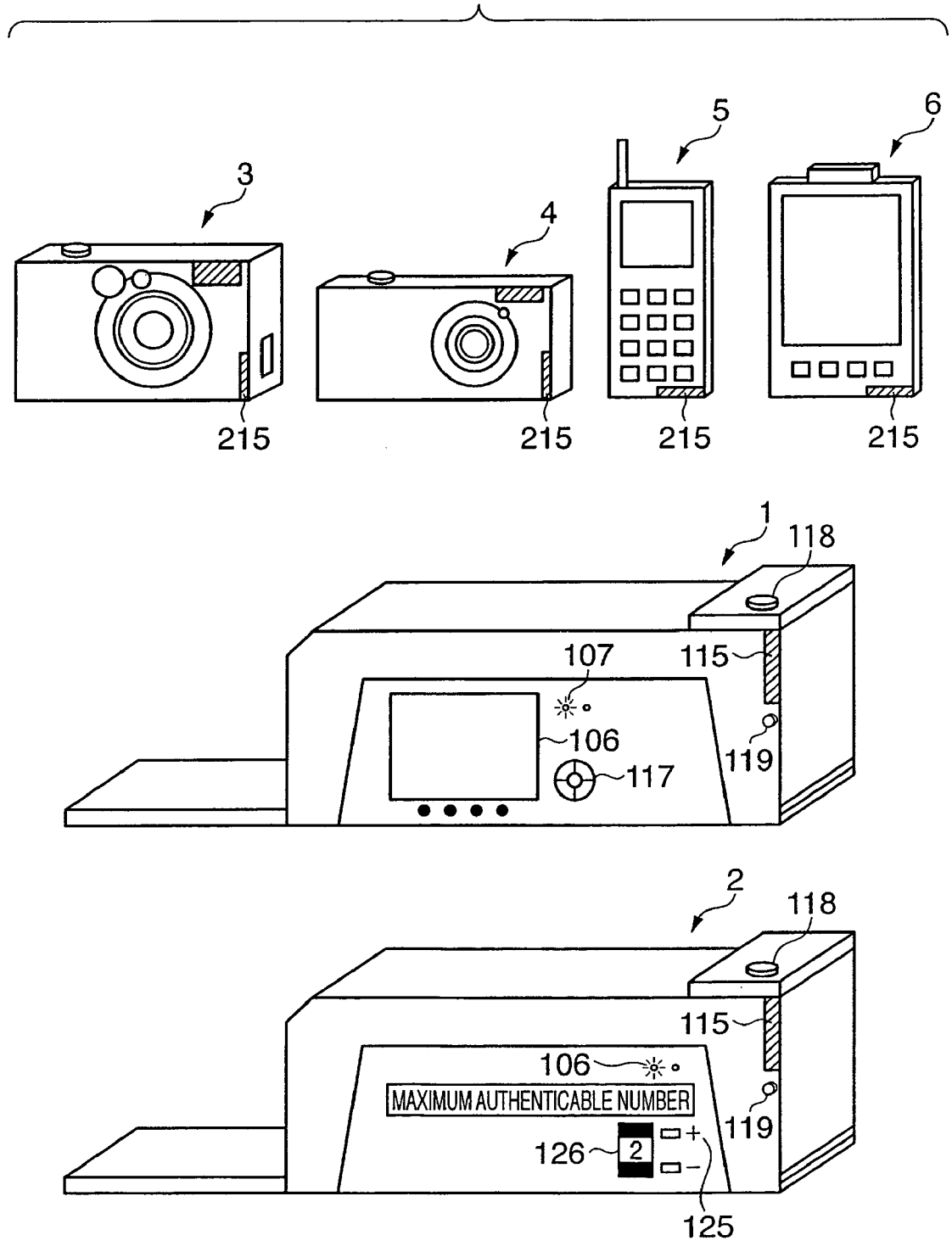
FIG. 1 is a diagram showing an example of a wireless communication apparatus according to an embodiment of the present invention.

FIG. 1 is a view showing an example of wireless communication apparatuses which can configure a system in an embodiment of the present invention. FIG. 1 shows a printing apparatus 1 and a printing apparatus 2 which are wireless communication host devices and a digital still camera 3, a digital still camera 4, a cellular phone 5 and a PDA 6 which are wireless communication function devices. The printing apparatus 1 and the printing apparatus 2 are hereinafter also respectively referred to as "host 1" and "host 2" and generally referred to as "host device", which denotes one of them. Further, the digital still camera 3, the digital still camera 4, the cellular phone 5 and the PDA 6 are hereinafter also respectively referred to as "device 3", "device 4", "device 5" and "device 6" and generally referred to as "function device", which denotes one of them.

Figure 2:
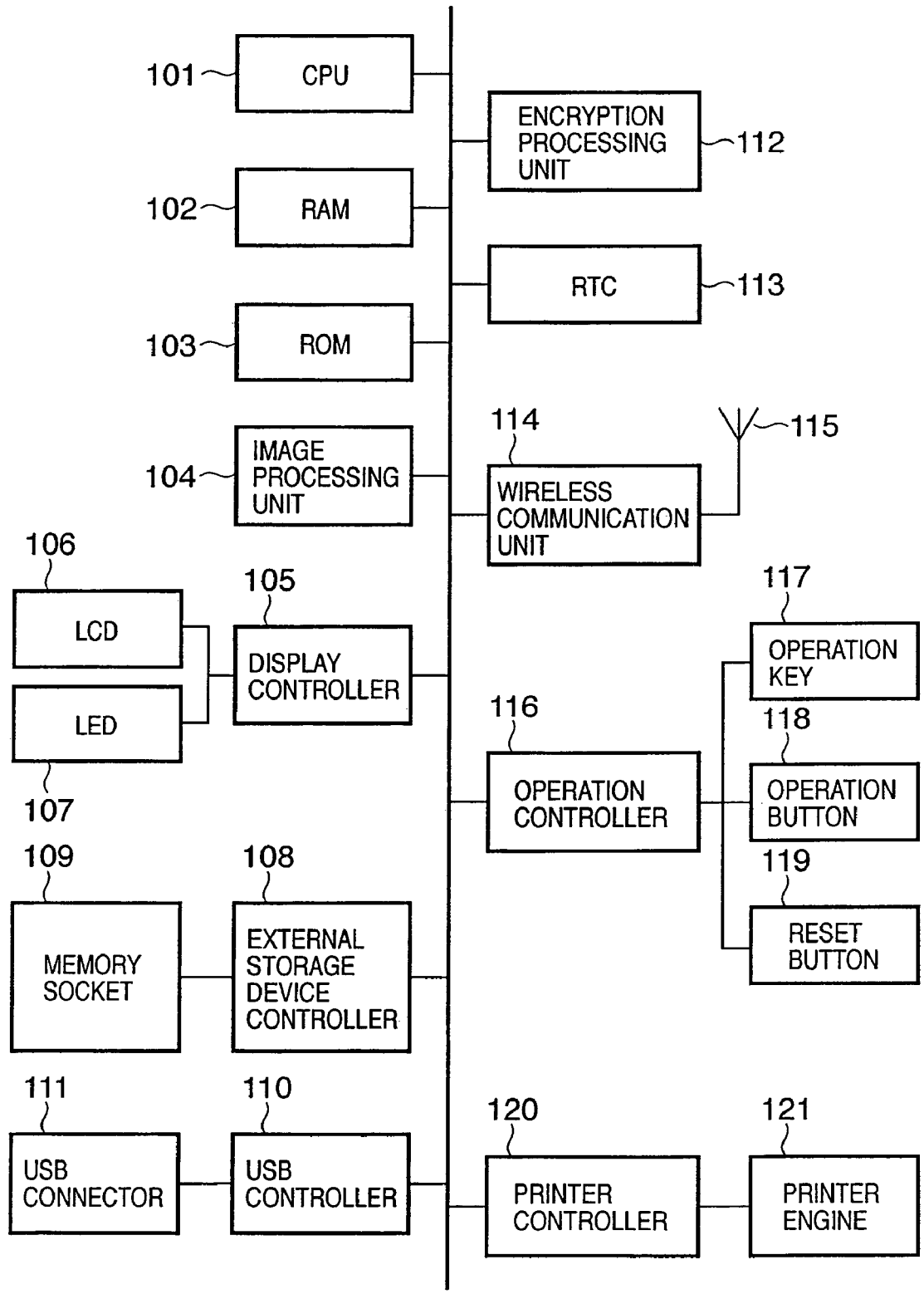
FIG. 2 is a block diagram showing a configuration of a printing apparatus as an example of a wireless communication host device according to the embodiment of the present invention.

FIG. 2 is a block diagram representatively showing a configuration of the host 1 as an example of the wireless communication host device according to this embodiment.

In FIG. 2, reference numeral 101 denotes a CPU which controls the entire host 1 and reference numeral 102 denotes a RAM which is used as a work area for the CPU 101. Reference numeral 103 denotes a ROM which stores processing procedures of the CPU 101 and comprises a rewritable non-volatile memory such as a flash memory. In addition, in the ROM 103, authentication information is stored as described later. Reference numeral 104 denotes an image processing unit which is used to convert digital image data or the like into printable digital data.

Reference numeral 105 denotes a display controller for various displays. Reference numeral 106 denotes a liquid crystal display device which is used to display user interfaces for confirmation of the digital image data or various types of settings. Reference numeral 107 denotes a light emitting diode which is used as an indicator for indicating processing state of the host 1.

Reference numeral 108 denotes a controller for external storage devices, which controls reading of digital data stored in a storage medium such as a compact flash (registered trademark) memory or a memory stick (registered trademark) inserted in a memory socket 109 and writing of digital data to the storage medium. Reference numeral 110 denotes a controller for USB interfaces, which can connect to other apparatuses having USB interfaces through a USB connector 111.

Reference numeral 112 denotes an encryption processing unit which is used to encrypt authentication information and during wireless data communication. Reference numeral 113 denotes a real time clock (RTC) which is used to count authentication period and to record access time. Reference numeral 114 denotes a wireless communication unit for wireless communication and reference numeral 115 denotes an antenna for wireless communication.

Reference numeral 116 denotes an operation controller, such as buttons or the like, for various types of operations, which transfers operation information of an operation key 117, an operation button 118 and a reset button 119 to the CPU 101. Reference numeral 120 denotes a printer controller for printer function of the host 1, and a printer engine 121 performs printing of the digital data.

The host 2 has basically almost the same configuration as that of the host 1 and is provided with the wireless communication unit 114 and the antenna 115 used for wireless communication as shown in FIG. 2.

Figure 3:
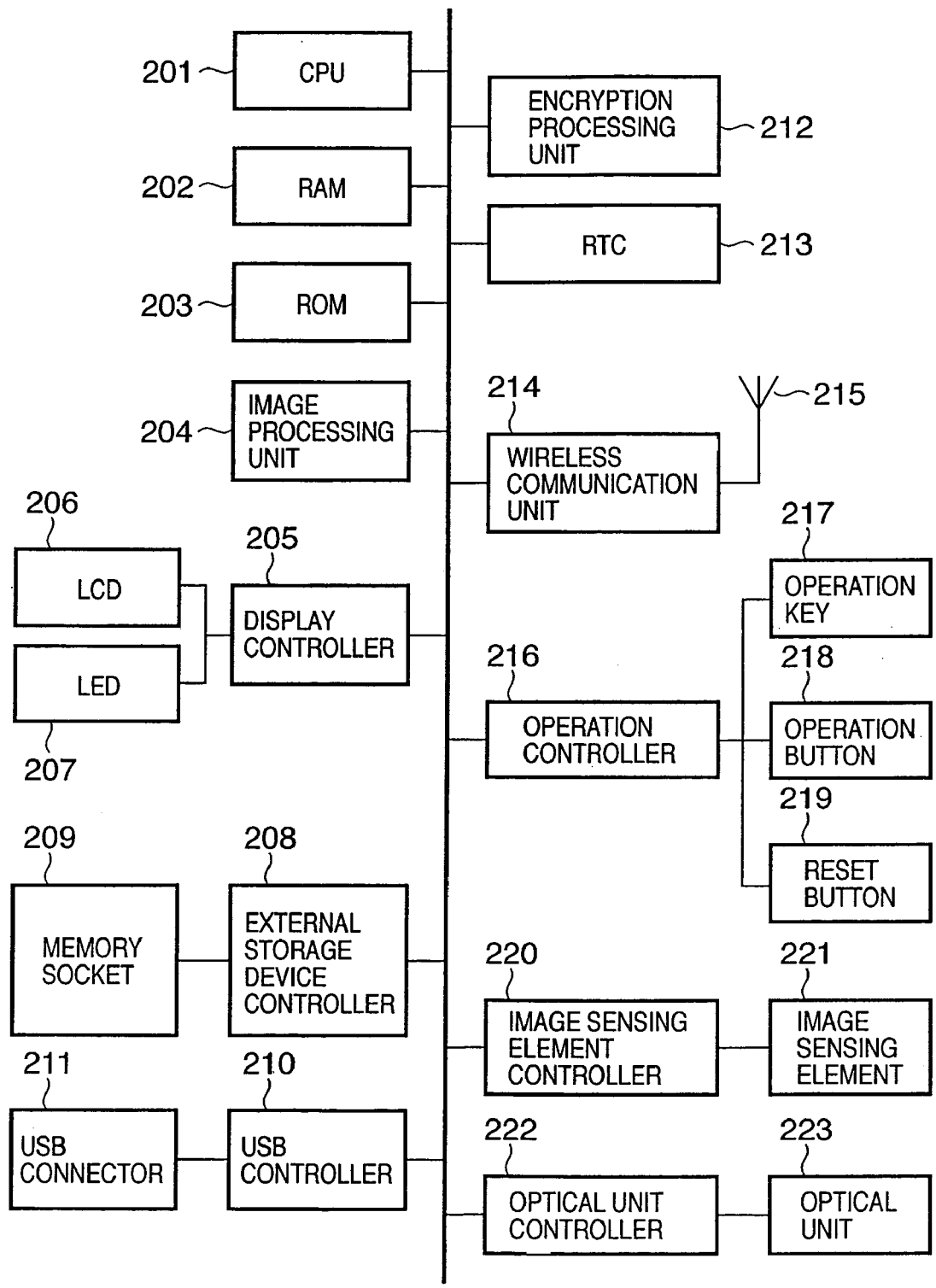
FIG. 3 is a block diagram showing a configuration of a digital still camera as an example of a wireless communication function device according to the embodiment of the present invention.

FIG. 3 is a block diagram representatively showing a configuration of the digital still camera 3 as an example of the wireless communication function device according to this embodiment.

In FIG. 3, reference numeral 201 denotes a CPU which controls the entire device 3 and reference numeral 202 denotes a RAM which is used as a work area for the CPU 201. Reference numeral 203 denotes a ROM which stores processing procedures of the CPU 201 and comprises a rewritable non-volatile memory such as a flash memory. In addition, in the ROM 203, authentication information is stored as described later. Reference numeral 204 denotes an image processing unit which is used to convert taken images into digital image data.

Reference numeral 205 denotes a display controller for various displays. Reference numeral 206 denotes a liquid crystal display device which is used to display user interfaces for confirmation of the sensed images and various settings. Reference numeral 207 denotes a light emitting diode which is used as an indicator for indicating processing state of the device 3.

Reference numeral 208 denotes a controller for external storage devices, which controls writing of digital data to a storage medium such as a compact flash (registered trademark) memory and a memory stick (registered trademark)

inserted in a memory socket 209 and reading of digital data stored in the storage medium. Reference numeral 210 denotes a controller for USB interfaces, which can connect to other apparatuses having USB interfaces through a USB connector 211.

Reference numeral 212 denotes an encryption processing unit which is used to encrypt authentication information and during wireless data communication. Reference numeral 213 denotes a real time clock (RTC) which is used to count authentication period and to record access time. Reference numeral 214 denotes a wireless communication unit for wireless communication and reference numeral 215 denotes an antenna for wireless communication.

Reference numeral 216 denotes an operation controller, such as buttons or the like, for various types of operations, which transfers operation information of an operation key 217, an operation button 218 and a reset button 219 to the CPU 201. Reference numeral 221 denotes an image sensing element and reference numeral 220 denotes an image sensing element controller for controlling the image sensing element 221. Reference numeral 223 denotes an optical unit which is mainly comprising lenses and their driving system and reference numeral 222 denotes an optical unit controller for controlling the optical unit 223.

The devices 4, 5, 6 are also provided with at least the wireless communication unit 214 and the antenna 215 used for wireless communication which are almost the same as in the device 3.

Next, in the host device and the function devices having the above described configurations, a method for setting maximum number of apparatuses to be authenticated (maximum authenticable numbers) and a method for easily setting the authentication information such as communication parameters and address identifiers required for wireless communication connection will be described. Although an ad hoc mode in IEEE 802.11b is assumed for simplicity in this embodiment, other wireless communication standards may be used.

First, a process of setting the maximum authenticable numbers in the host devices and the function devices will be described.

Figure 4:
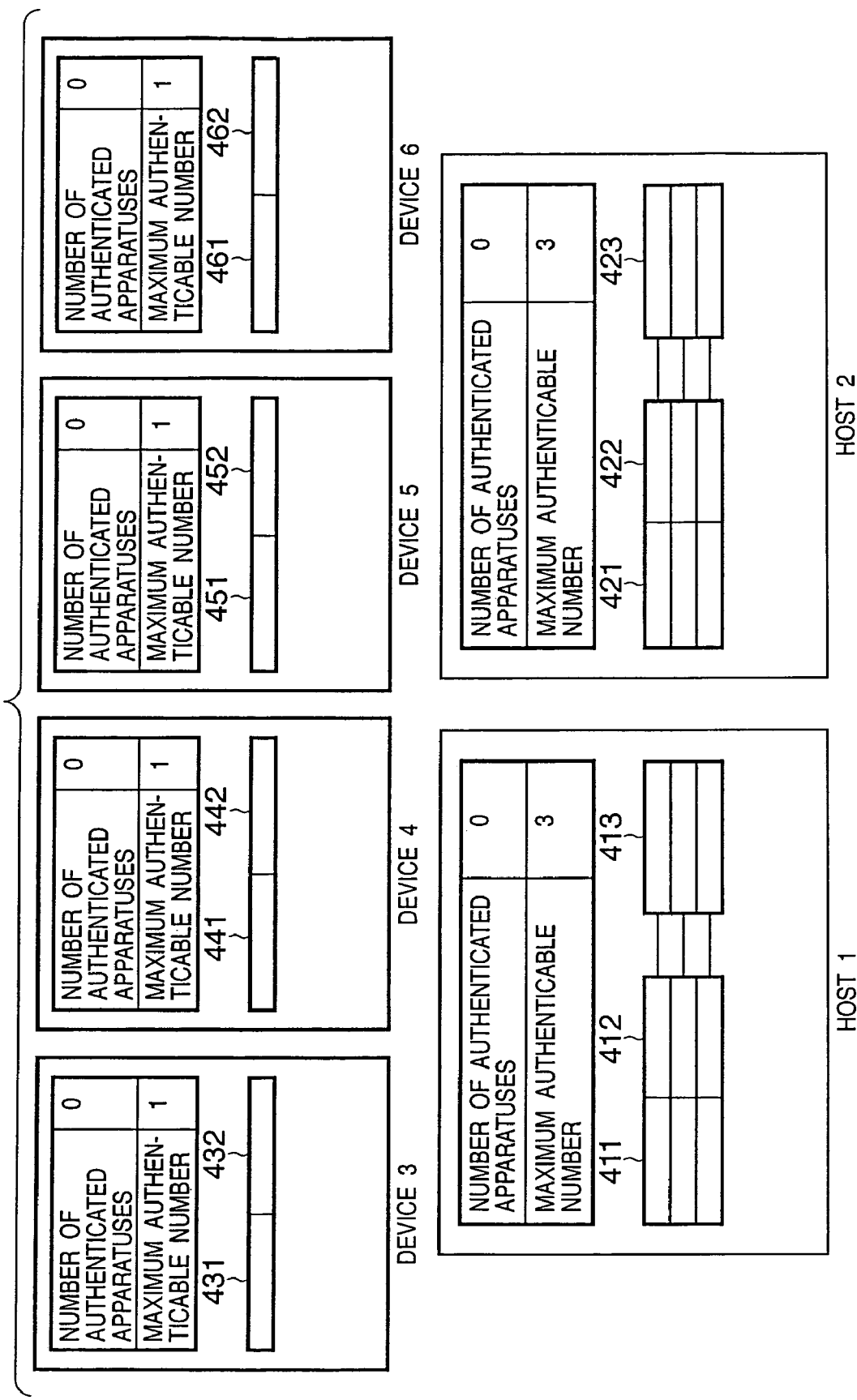
FIG. 4 is a conceptual view showing an example of information in an initial state stored in authentication information storing areas of the wireless communication host device and the wireless communication function device according to the embodiment of the present invention.

FIG. 4 is a conceptual view showing an example of information in an initial state stored in authentication information storing areas secured in the ROMs 103, 203 of the host devices and the function devices, i.e. an example of information before setting the maximum authenticable numbers and before mutual authentication. In FIG. 4, reference numerals 411, 421, 431, 441, 451, 461 denote connection partner storing areas for storing connection partners. Reference numerals 412, 422, 432, 442, 452, 462 denote authentication information areas for storing the authentication information and reference numerals 413 and 423 are access condition storing areas for storing access conditions. Before authentication, only default maximum authenticable numbers are set in the host devices and the function devices, while authentication information and other items are all empty. In this state, the maximum authenticable numbers of the hosts 1, 2 is 3 and the maximum authenticable numbers of the devices 3, 4, 5, 6 are 1. As can be seen from FIG. 4, the areas for storing connection partners, authentication information and access conditions are secured for the set maximum authenticable number of apparatuses in each apparatus.

Figure 5:
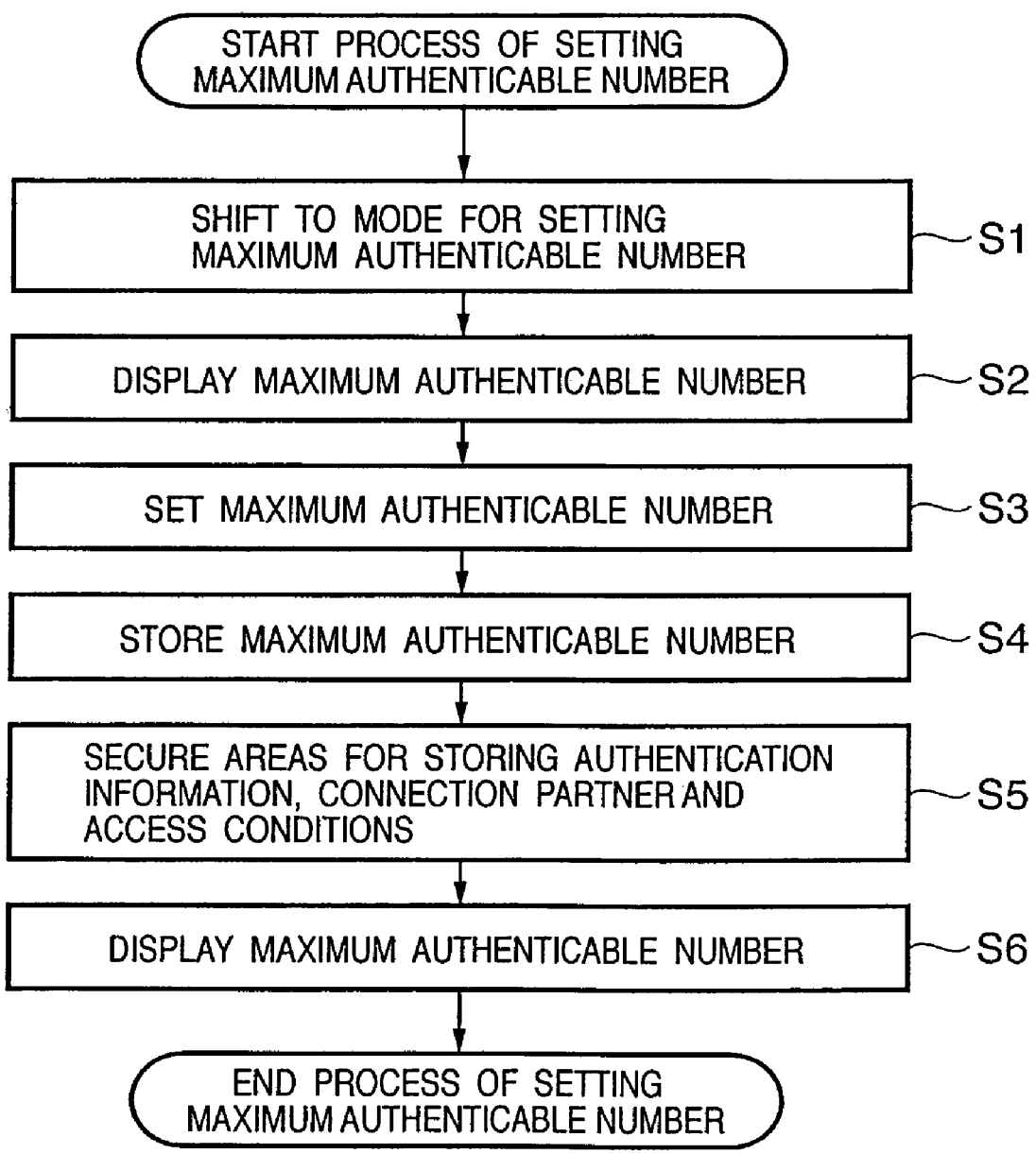
FIG. 5 is a flowchart showing a process of setting the maximum numbers of apparatuses up to which the wireless communication host device and the wireless function device authenticate (referred to as "maximum authenticable numbers" hereinafter according to the embodiment of the present invention.

FIG. 5 is a flowchart showing a procedure for setting the maximum authenticable numbers in the host devices and the function devices. First, the operation buttons 118, 218 or the operation keys 117, 217 provided on the host devices and the function devices are operated to shift to a mode for setting the maximum authenticable number (step S1). Upon shifting to the mode for setting the maximum authenticable number, the host devices and the function devices display the maximum authenticable numbers which are currently set, on the liquid crystal display devices 106, 206 (step S2). For the host devices and the function devices which are not provided with the liquid crystal display devices, they are provided with, for example, a counter linked to a push button switch to indicate the maximum authenticable number by the number displayed on the counter. In this embodiment, it is assumed that the host 2 has such a configuration. Then, the operation buttons 118, 218 or the operation keys 117, 217 are operated to set the maximum authenticable numbers (step S3).

Figure 6A:
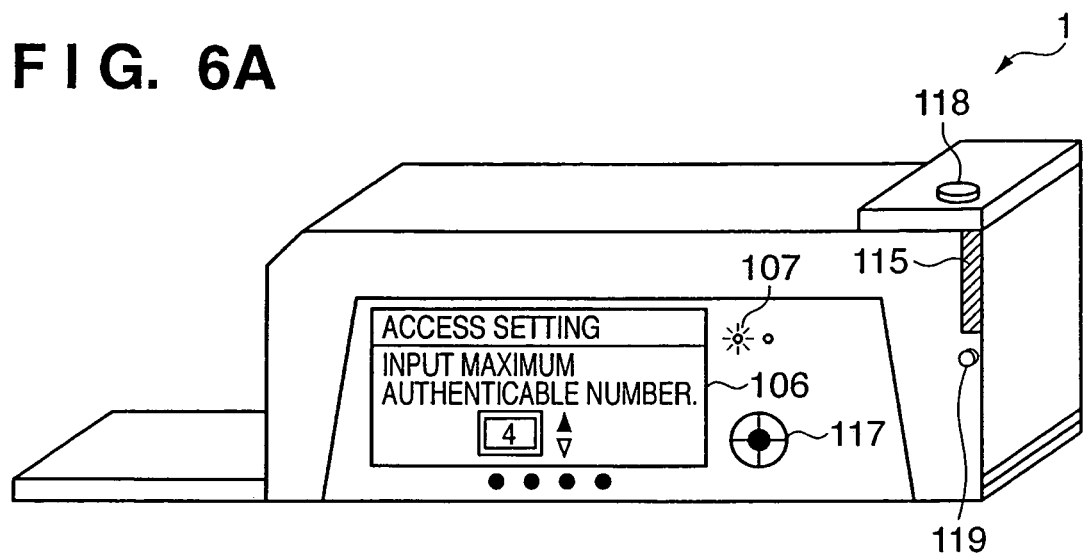
FIGS. 6A to 6C are views showing examples of user interfaces of the host device and the function devices during setting the maximum authenticable number according to the embodiment of the present invention.
Figure 6B:
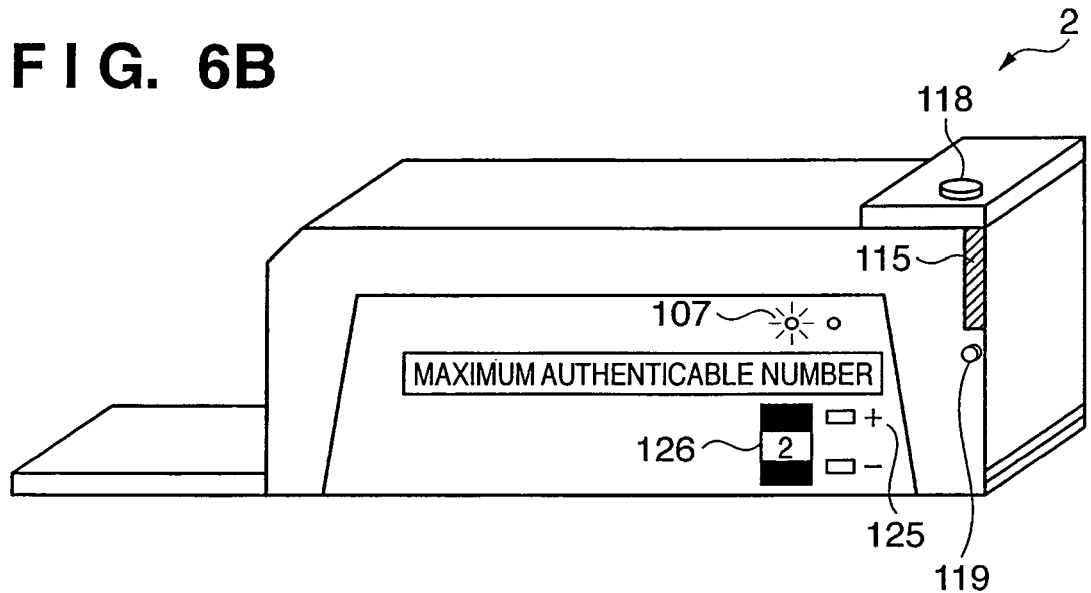
Figure 6C:
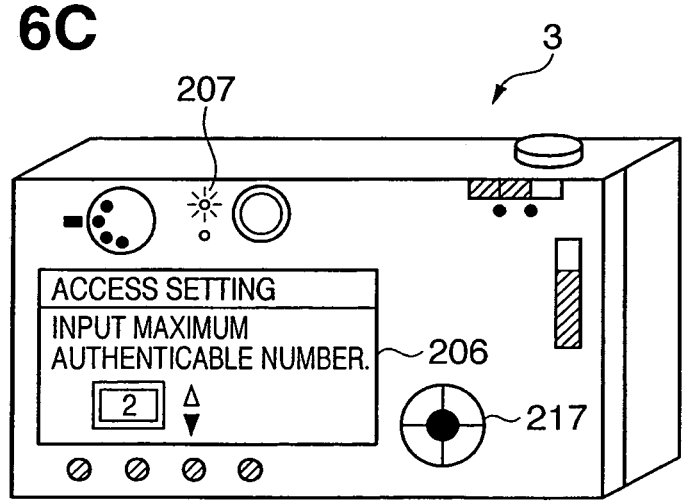

FIGS. 6A to 6C are views showing examples of user interfaces of the host devices and the function device during setting the maximum authenticable number in step S3. FIG. 6A shows a user interface in the host 1 provided with the liquid crystal display device 106. Because a message, which indicates that the maximum authenticable number is to be set, is displayed on the liquid crystal display device 106, a user can set the maximum authenticable number by operating the operation key 117 according to the displayed message. The light emitting diode 107 may light up or blink as an indicator in response to operations during setting.

FIG. 6B shows a user interface in the host 2. The host 2 does not have the liquid crystal display device 106 and is provided with a counter 126 linked to a push button switch 125 so that the push button switch 125 is operated to set the maximum authenticable number. The light emitting diode 107 may light up or blink as an indicator in response to operations during setting. In the host 2, the maximum authenticable number can be set without shifting to the mode for setting the maximum authenticable number.

FIG. 6C shows a user interface in the device 3 provided with the liquid crystal display device 206. Because a message, which indicates that the maximum authenticable number is to be set, is displayed on the liquid crystal display device 206, the user can set the maximum authenticable number with the operation key 217 according to the displayed message. The light emitting diode 207 may light up or blink as an indicator according to operations during setting.

After the maximum authenticable numbers are input to the host devices and function devices with the user interfaces as shown in FIGS. 6A to 6C, the maximum authenticable numbers are stored in the authentication information storing areas provided in the ROMs 103, 203 (step S4). Then, the areas for storing authentication information, connection partners and access conditions are secured in the authentication information storing areas provided in the ROMs 103, 203 (step S5). After the areas for storing authentication information, connection partners and access conditions are secured in the authentication information storing areas in step S5, the updated maximum authenticable numbers are displayed on the liquid crystal display devices 106, 206 or the counter 126 (step S6) and the setting of the maximum authenticable number is completed.

Figure 7:
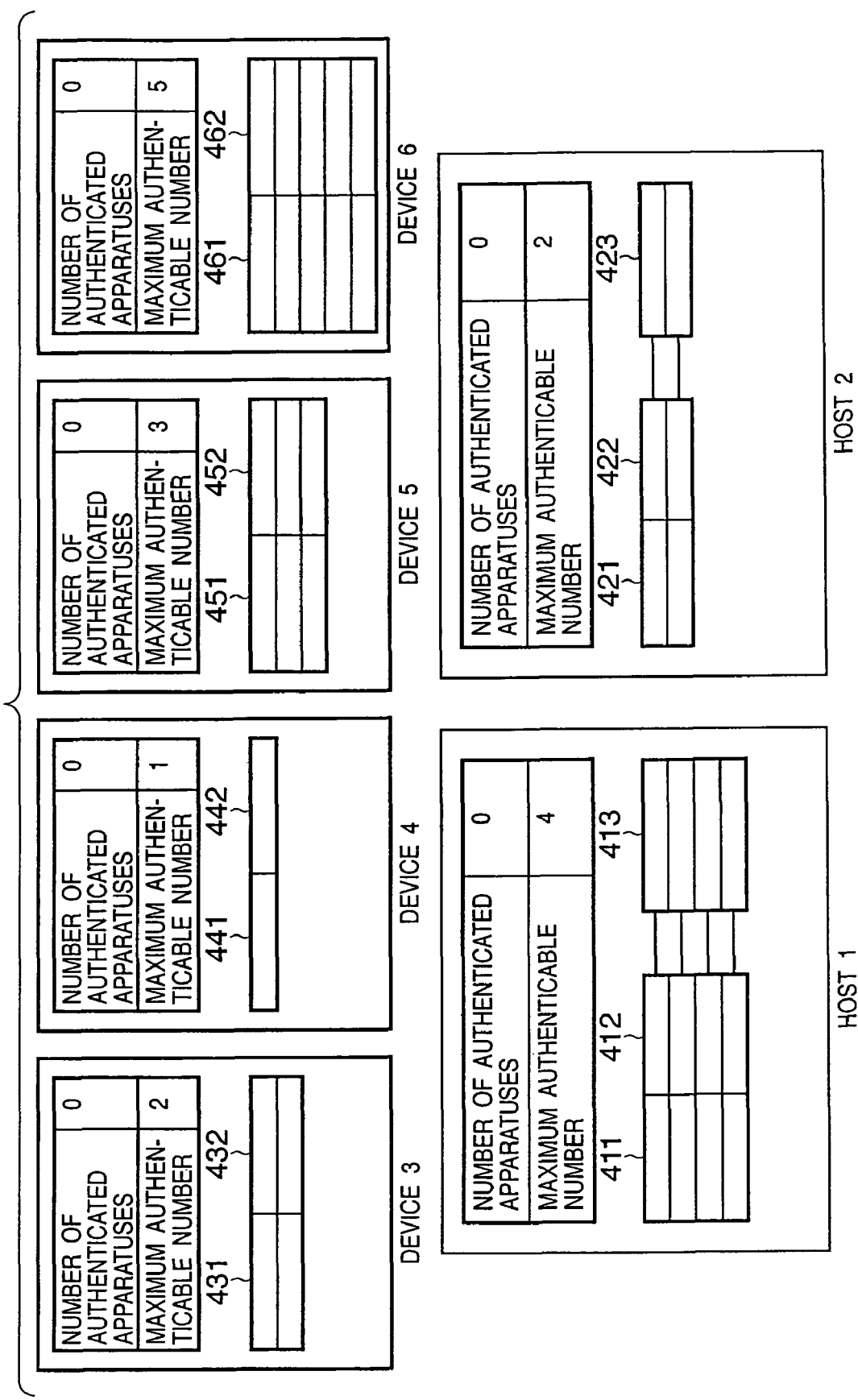
FIG. 7 is a view showing an example of information stored in the authentication information storing areas after setting the maximum authenticable numbers for the wireless communication host device and the wireless communication function device and before mutual authentication.

FIG. 7 is a conceptual view showing an example of the authentication information storing areas in the host device and the function devices after setting the maximum authenticable numbers according to the examples shown in FIGS. 6A to 6C. In the example shown in FIG. 7, the maximum authenticable number of the host 1 is 4 and the maximum authenticable number of the host 2 is 2, in this state. Further, the maximum authenticable number of the device 3 is 2; the device 4, 1; the device 5, 3; and the device 6, 5. Because the host devices and the function devices are here in a stage before authentication processing, the authentication information and other items are all empty. As can be seen from FIG. 7, the areas for storing connection partners, authentication information and access conditions are increased or decreased according to changes in the maximum authenticable number, in comparison to that in FIG. 4.

Next, an operation of setting the authentication information such as communication parameters and address identifiers required for wireless communication connection will be described. Several methods will be herein described, and a method for setting and storing tally authentication information will be firstly described.

Figure 8:
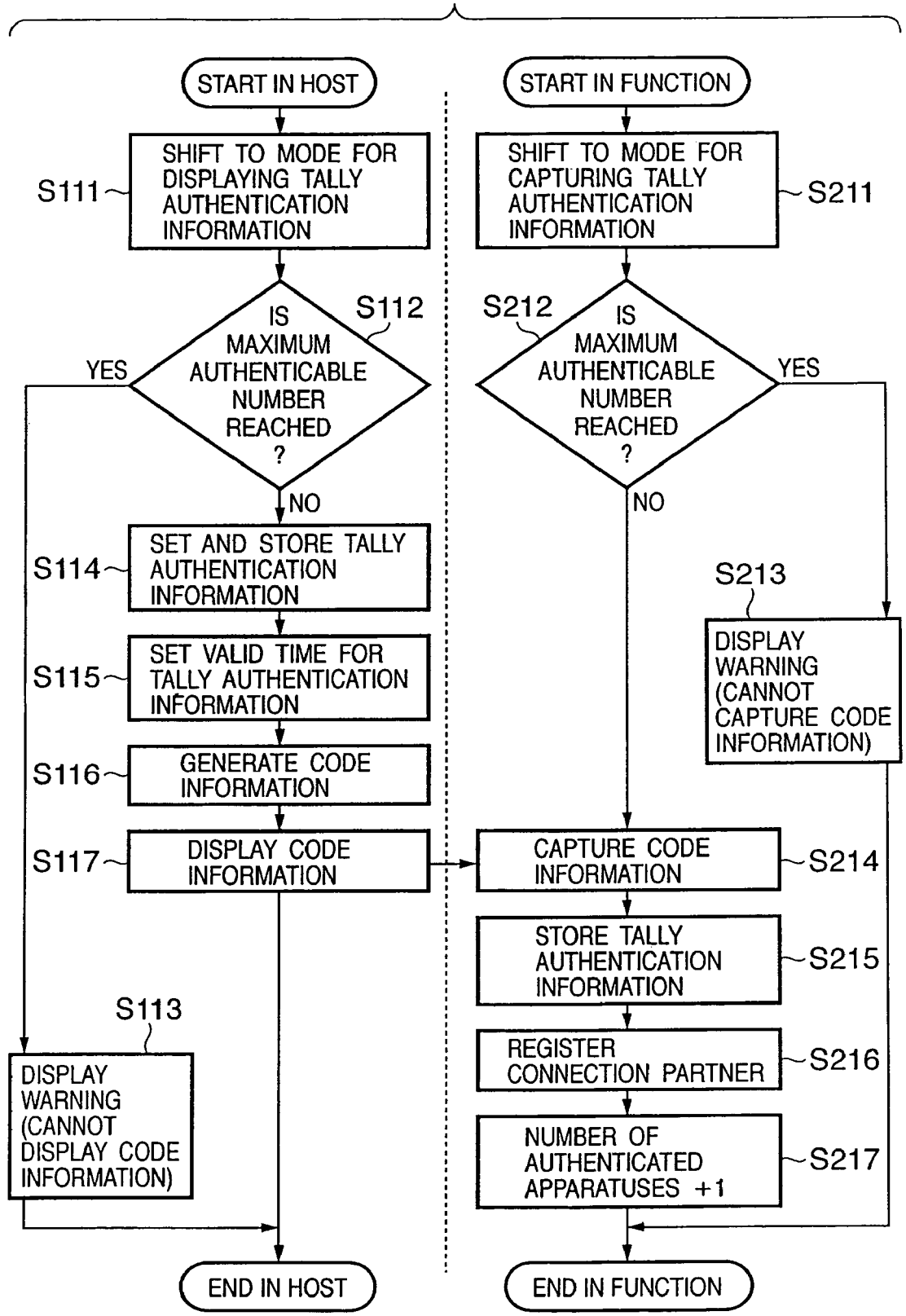
FIG. 8 is a flowchart showing, in parallel, a process of setting and storing the authentication information between the wireless communication host device having a liquid crystal display unit and the wireless communication function device having an image sensing element according to the embodiment of the present invention.
Figure 9:
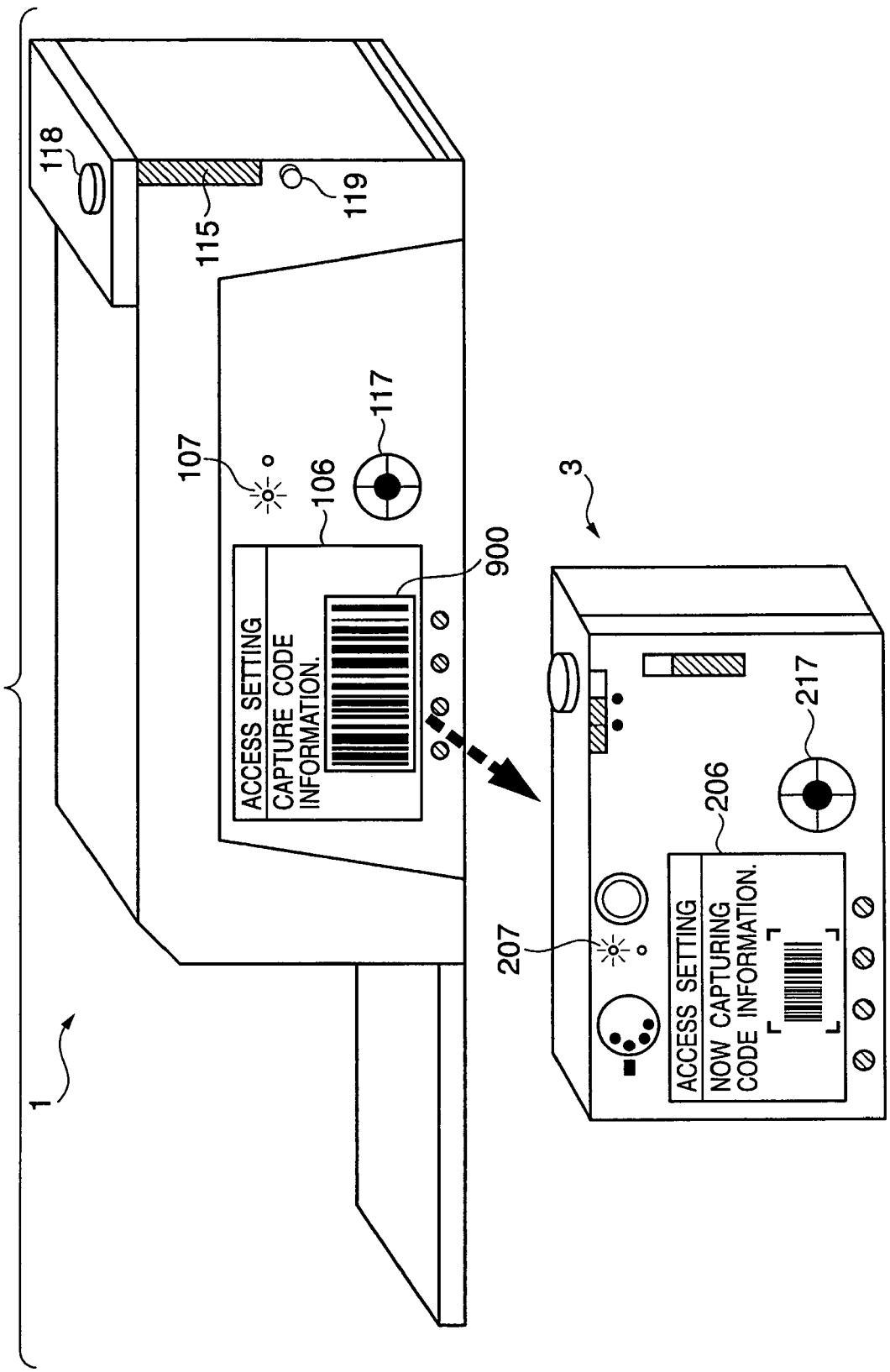
FIG. 9 is a view showing an example of user interface display in the process in FIG. 8.

FIG. 8 is a flowchart showing, in parallel, a process of setting and storing the tally authentication information between the host device provided with the liquid crystal display device 106 and the function device provided with the image sensing element 221. In this process, a procedure is shown in which the host device displays code information including the tally authentication information including the individual information of the host device on the liquid crystal display device and the function device sets and stores the tally authentication information. In addition, FIG. 9 is a view showing an example of user interface displayed when the tally authentication information is set and stored between the host device provided with the liquid crystal display device 106 (here, the host 1) and the function device (here, the device 3).

Figure 10A:
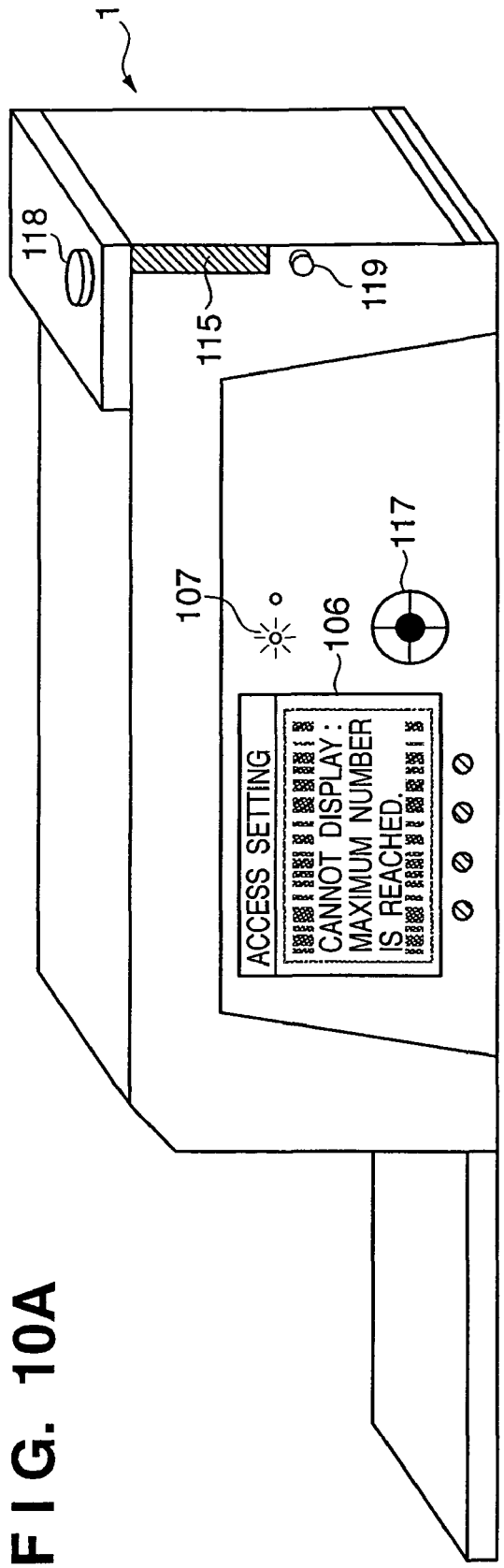
FIGS. 10A and 10B are views showing examples of warning display in the process in FIG. 8.
Figure 10B:
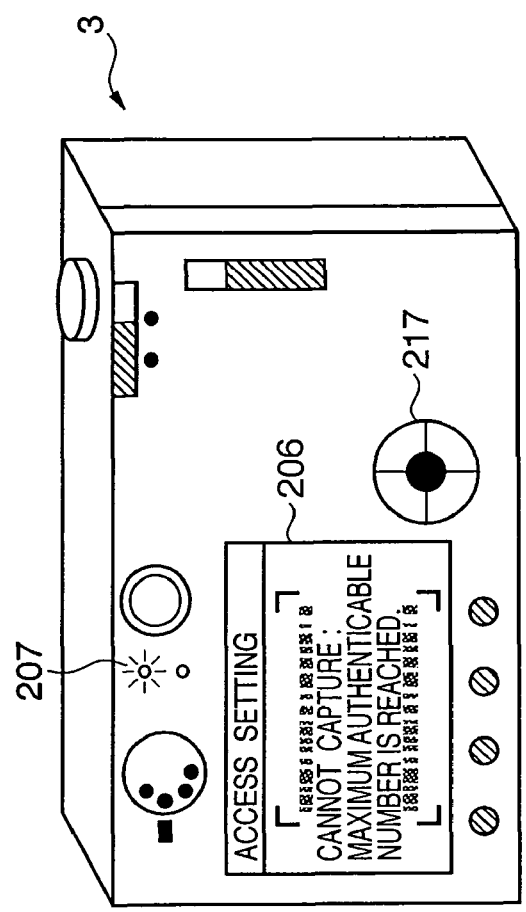

First, in the host device, the operation key 117 and/or the button 118 are operated to shift to a mode for displaying the tally authentication information (step S111). On the other hand, in the function device, the operation key 217 is operated to shift to a mode for capturing the tally authentication information (step S211). Then, it is determined whether the maximum authenticable number is reached in each of the host device and the function device (step S112, step S212). If yes, a warning indicating that there is no room for authenticating a new device is displayed (steps S113, S213). FIG. 10A shows one example of the warning display in the host 1 and FIG. 10B shows one example of the warning display in the device 3. After the warning display, the mode for displaying the tally authentication information and the mode for capturing the tally authentication information are ended.

If the maximum authenticable number has not been reached in the host device, the tally authentication information including the individual information of the host device is newly set and stored (step S114) and a valid time is set for the tally authentication information (step S115). When the valid time is set for the tally authentication information, the host device starts to count for an authenticable period which is prescribed in the system using the real time clock 113. The stored tally authentication information may be deleted when the valid time exceeds the authenticable period. Then, the host device generates code information 900 (one-dimensional or two-dimensional code information) based on the tally authentication information which is newly set and stored in step S114 (step S116) and displays the code information 900 on the liquid crystal display device 106 (step S117). Then, the host device ends the mode for displaying the tally authentication information.

On the other hand, if the maximum authenticable number has not been reached in the function device (NO in step S212), the function device displays a message indicating that the code information is now being captured and a frame in which the code information is contained, on the liquid crystal display device 206. Then, the function device displays image information captured by the image sensing element 221 on the liquid crystal display device 206 and automatically captures the code information 900 when the code information 900 falls into the frame (step S214) to analyze the captured code information 900. Then, the function device stores the tally authentication information of the host device included in the code information 900 (step S215) and registers the concerned host device as an option of the wireless data communication connection partner (step S216). Thereafter, the function device increments the number of authenticated device/devices by 1 (step S217) and ends the mode for capturing the tally authentication information.

Figure 11:
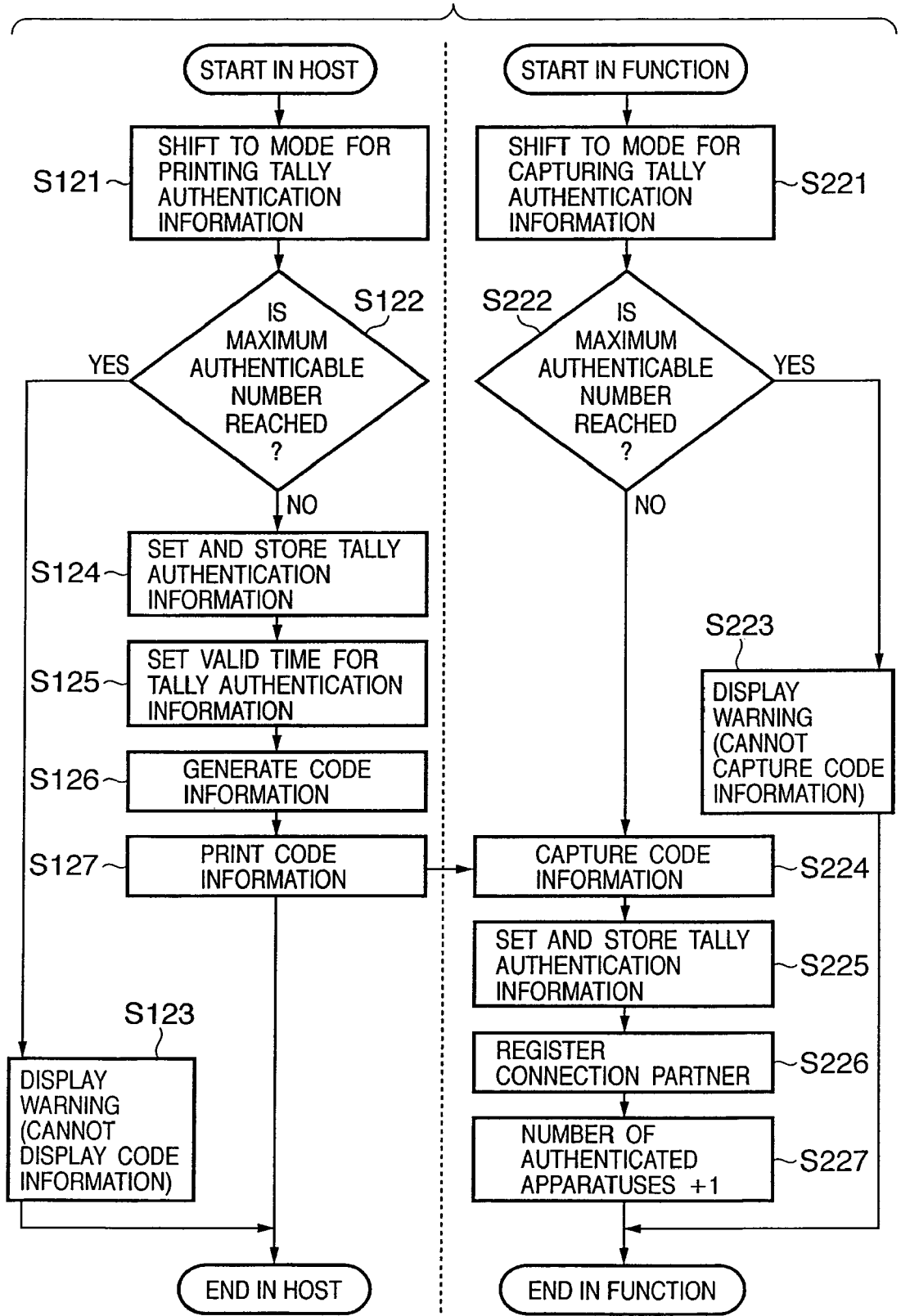
FIG. 11 is a flowchart showing, in parallel, a process of setting and storing the authentication information between the wireless communication host device having no liquid crystal display unit and the wireless communication function device having the image sensing element according to the embodiment of the present invention.
Figure 12:
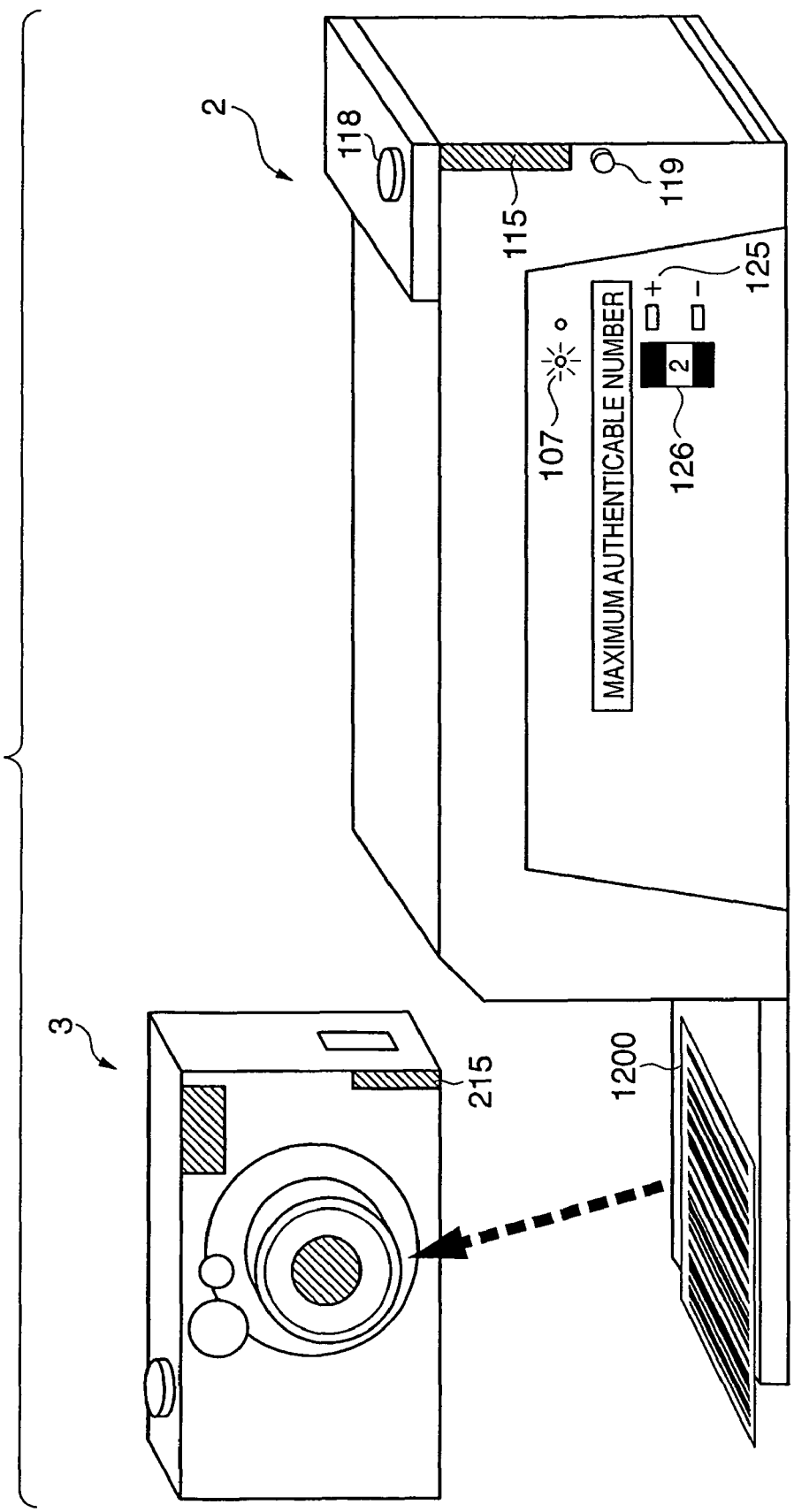
FIG. 12 is a view showing an example of user interface display in the process in FIG. 11.

FIG. 11 is a flowchart showing, in parallel, a process of setting and storing the tally authentication information as the authentication information such as communication parameters and address identifiers required for wireless communication connection between the host device provided with no liquid crystal display device 106 and the function device provided with the image sensing element 221. In addition, FIG. 12 is a view showing an example of user interface display when the tally authentication information is set and stored between the host device provided with no liquid crystal display device 106 (here, the host 2) and the function device provided with the image sensing element 221 (here, the device 3).

In FIG. 11, firstly in the host device, the operation button 118 is operated to shift to a mode for printing the tally authentication information (step S121). On the other hand, in the function device, the operation key 217 is operated to shift to a mode for capturing the tally authentication information (step S221). Then, it is determined whether the maximum authenticable number is reached for the host device and the function device (step S122, step S222). If yes, a warning is displayed (steps S123, S223) and the mode for printing the tally authentication information and the mode for capturing the tally authentication information are ended. However, in the host device provided with no liquid crystal display device 106 as in FIG. 12, code information 1200 described later may not be printed or the light emitting diode 107 may light up or blink to notify the warning.

If the maximum authenticable number has not been reached in the host device, the tally authentication information including the individual information of the host device is newly set and stored (step S124) and a valid time is set for the tally authentication information (step S125). When the valid time is set for the tally authentication information, the host device starts to count for an authenticable period which is prescribed in the system using the real time clock 113. The stored tally authentication information may be deleted when the valid time exceeds the authenticable period. Then, the host device generates code information 1200 (one-dimensional or two-dimensional code information) based on the tally authentication information which is newly set and stored in step S124 (step S126) and prints the code information 1200 (step S127). Then, the host device ends the mode for printing the tally authentication information.

On the other hand, if the maximum authenticable number has not been reached in the function device (NO in step S222), the function device displays a message indicating that the code information is now being captured and a frame in which the code information is contained, on the liquid crystal display device 206. Then, the function device displays image information captured by the image sensing element 221 on the liquid crystal display device 206 and automatically captures the code information 1200 when the code information 1200 falls into the frame (step S224) to analyze the captured code information 1200. Then, the function device stores the tally authentication information of the host device included in the code information 1200 (step S225) and registers the concerned host device as an option of the wireless data communication connection partner (step S226). Thereafter, the function device increments the number of authenticated device/devices by 1 (step S227) and ends the mode for capturing the tally authentication information.

Figure 13:
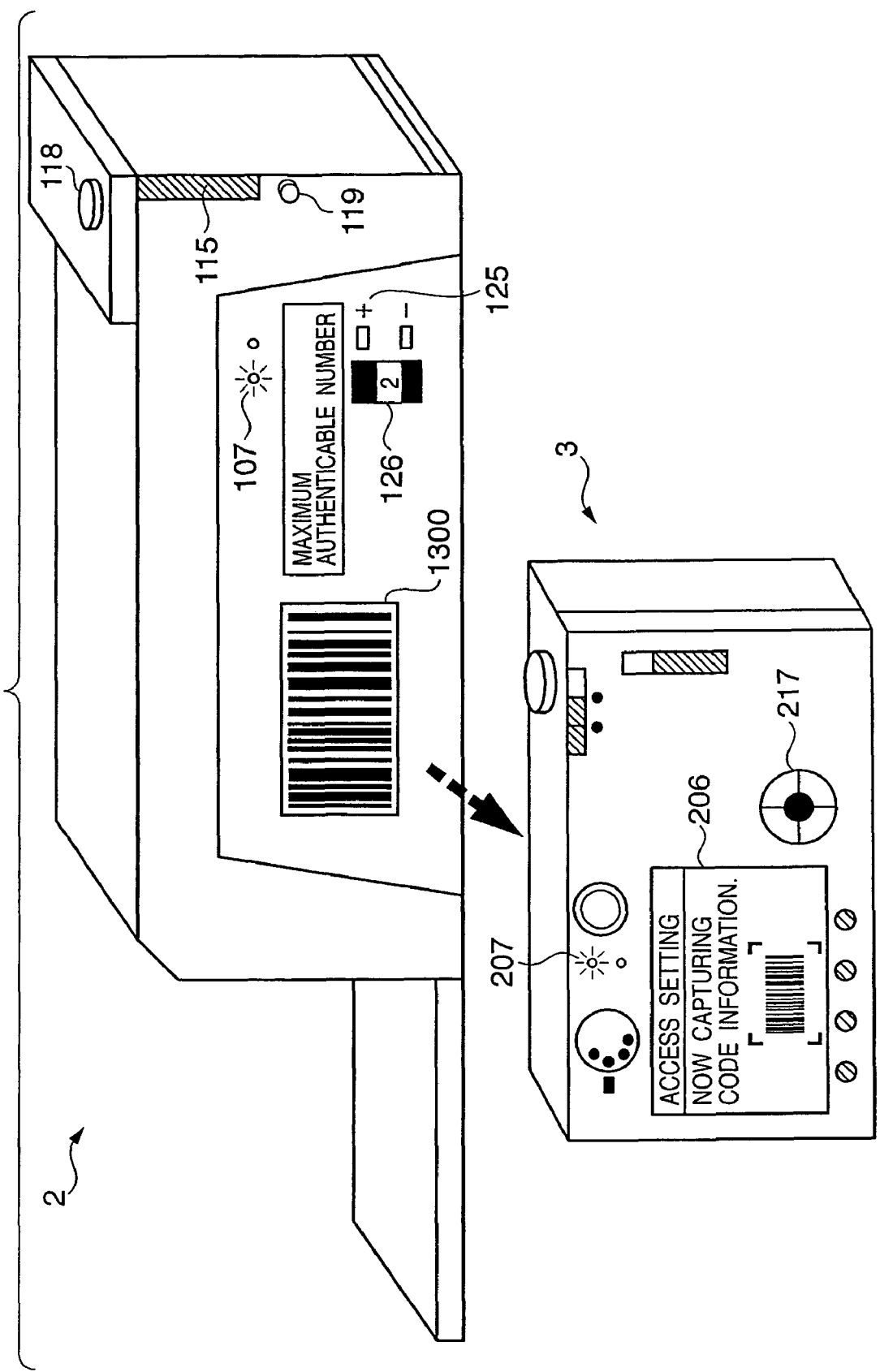
FIG. 13 is a view showing an example of user interface display upon capturing code information including authentication information of the host device, which is attached on a housing of the wireless communication host device having no liquid display unit, by the image sensing element of the wireless communication function device according to the embodiment of the present invention.

As shown in FIG. 13, code information 1300 including the tally authentication information of the host device may be attached on a housing of the host device. In such a case, only the process on the side of the function device in FIG. 8 or FIG. 11 is effective. On the side of the host device, the tally authentication information including the individual information of the host device is not newly set and stored. The function device starts the mode for capturing the tally authentication information and then captures the code information attached on the housing of the host device according to the flowchart in FIG. 8 or FIG. 11 to store the tally authentication information and thereafter ends the mode for capturing the tally authentication information.

Figure 14:
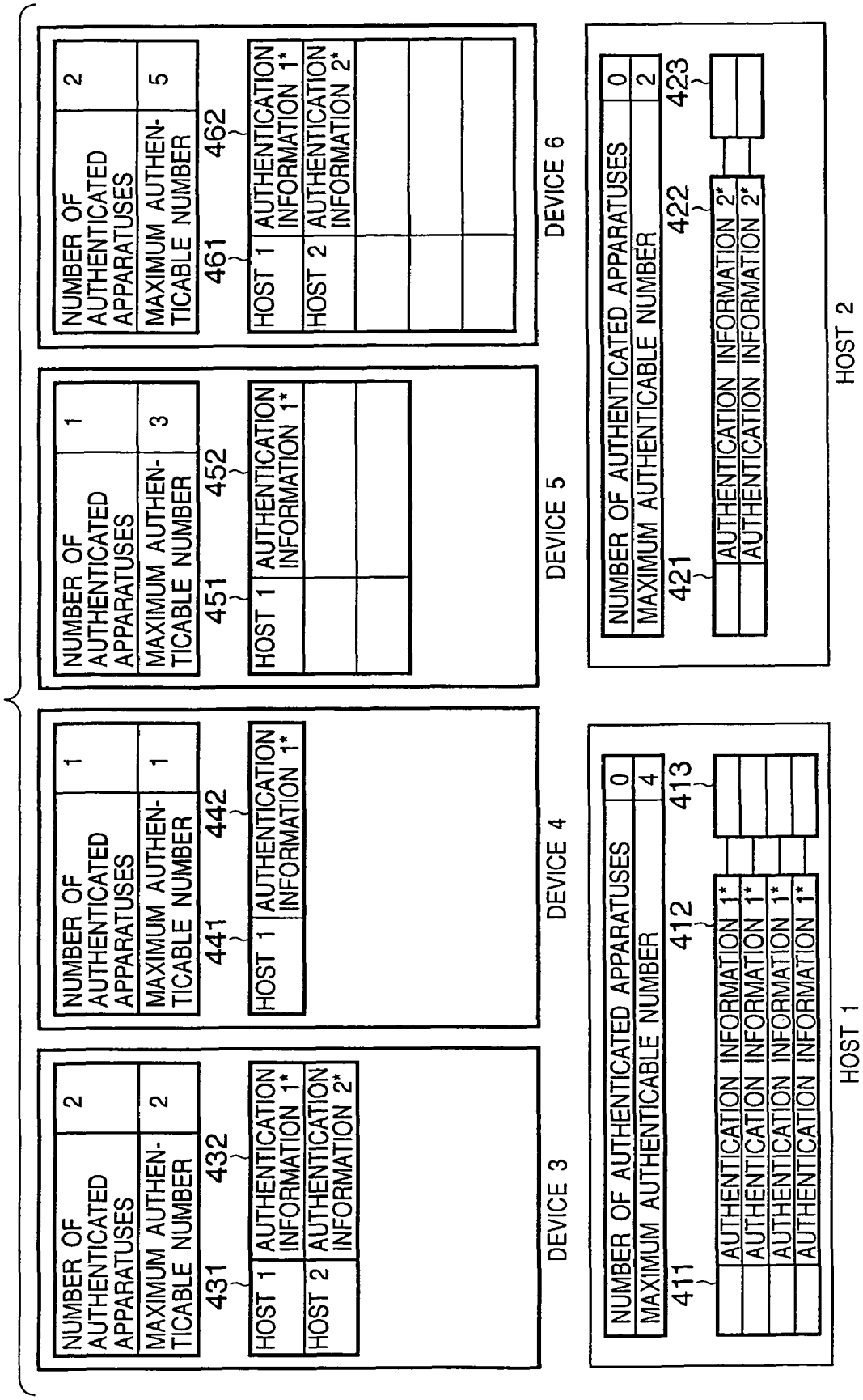
FIG. 14 is a view showing an example of information stored in the authentication information storing areas after performing the process shown in the flowchart in FIG. 8 or 11.

FIG. 14 is a conceptual view showing an example of information stored in the authentication information storing areas after the process of setting and storing the tally authentication information shown in the flowchart in FIG. 8 or FIG. 11.

In the authentication information storing area 432 of the device 3, tally authentication information 1* of the host 1 and tally authentication information 2* of the host 2 are stored, while in the connection partner storing area 431, the host 1 and the host 2 are registered as options of the wireless data communication connection partner. Each of 4 tally authentication information 1* stored in the host 1 may have the same content or different content. Also, each of the tally authentication information 2* stored in the host 2 may have the same content or different content. In the authentication information storing area 442 of the device 4, the tally authentication information 1* of the host 1 is stored, while in the connection partner storing area 441, the host 1 is registered as an option of the wireless data communication connection partner. In the authentication information storing area 452 of the device 5, the tally authentication information 1* of the host 1 is stored, while in the connection partner storing area 451, the host 1 is registered as an option of the wireless data communication connection partner. Because the maximum authenticable number of the device 5 is 3, the device 5 can authenticate two more host devices. In the authentication information storing area 462 of the device 6, the tally authentication information 1* of the host 1 and the tally authentication information 2* of the host 2 are stored, while in the connection partner storing area 461, the host 1 and the host 2 are registered as options of the wireless data communication connection partner. Because the maximum authenticable number for the device 6 is 5, the device 6 can authenticate three more host devices.

Further, in the authentication information storing area 412 of the host 1, the tally authentication information 1* of the host 1 is stored, while in the authentication information storing area 422 of the host 2, the tally authentication information 2* of the host 2 is stored. At this point in time, because no specific function device is registered as an option of the wireless data communication connection partner in the host 1 and the host 2, the connection partner storing areas 411, 421 and the access condition storing areas 413, 423 are empty.

As can be seen from FIG. 14, in the process of setting and storing the authentication information illustrated in the flowchart in FIG. 8 or FIG. 11, only the tally authentication information of the host device is set and stored in the authentication information storing area of the host device. On the other hand, in the authentication information storing area of the function device, the tally authentication information of the host device/devices and the specific host device/devices as an option of the wireless data communication connection partner/partners are stored. In this way, no specific function device is stored in the authentication information storing area of the host device as an option of the wireless data communication partner. This state is a semi-authenticated state in which only the tally authentication information is stored.

The host and function devices, which are in the semi-authenticated state by the authentication process shown in the flowchart in FIG. 8 or FIG. 11, mutually authenticate by performing a process of establishing a wireless data communication path, thereby transfer to a complete authenticated state. This process will be described later with reference to the flowchart in FIG. 18.

Next, a method for setting and storing the authentication information via wireless communication will be described as another example of the operation of setting the authentication information such as communication parameters and address identifiers required for wireless communication connection.

Figure 15:
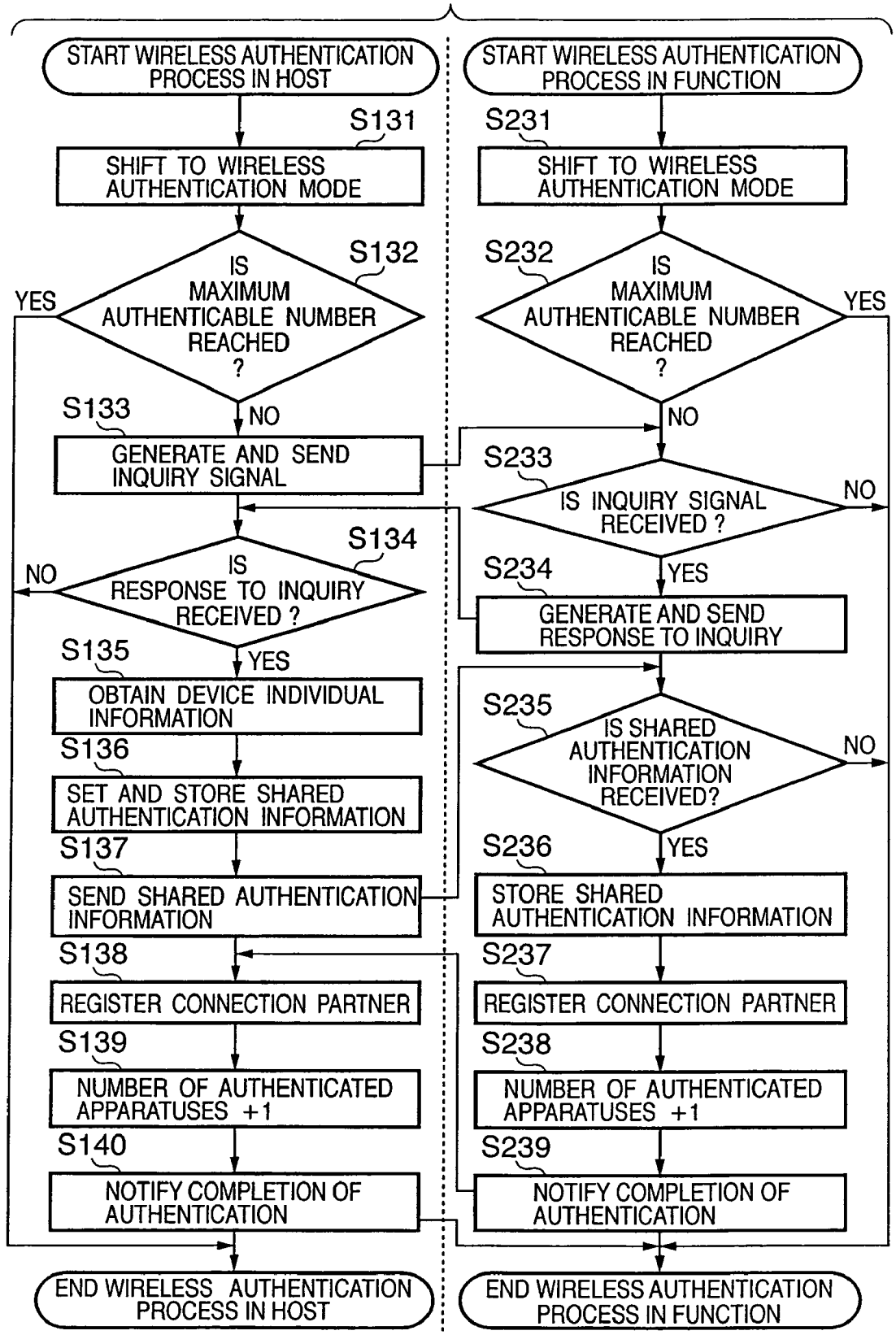
FIG. 15 is a flowchart showing, in parallel, a process of setting and storing the authentication information by wireless communication between the wireless communication host device and the wireless communication function device according to the embodiment of the present invention.
Figure 16:
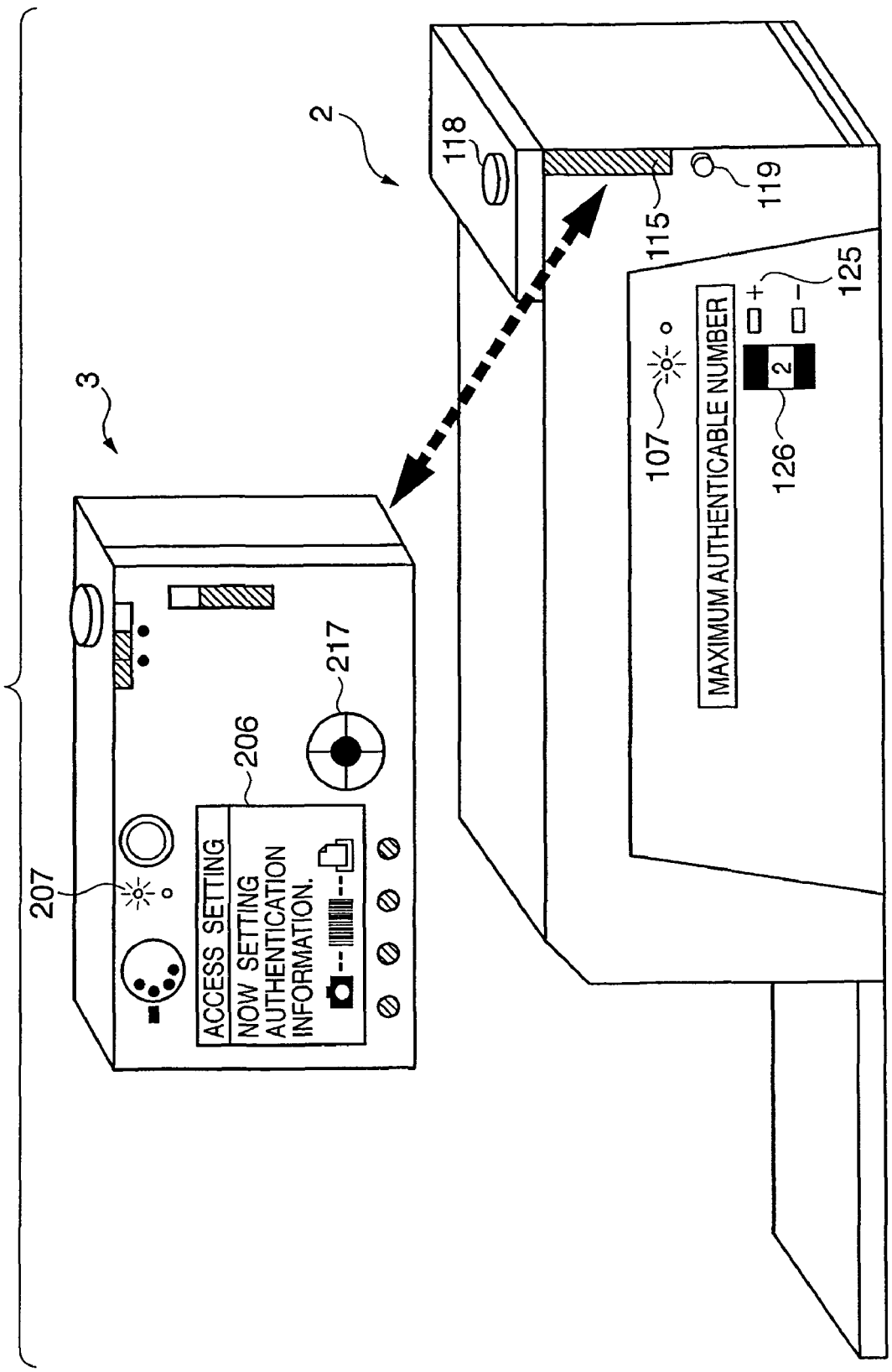
FIG. 16 is a view showing an example of user interface display in the process in FIG. 15.

FIG. 15 is a flowchart showing, in parallel, a process of setting and storing the authentication information via wireless communication between the host device and the function device. In addition, FIG. 16 is a view showing an example of user interface display when the authentication information is set and stored via wireless communication.

First, the operation button 118 is operated in the host device and the operation key 217 is operated in the function device to shift to a wireless authentication mode, respectively (step S131, step S231). Then, it is determined whether the maximum authenticable number is reached in each of the host device and the function device (step S132, step S232). If yes, the wireless authentication mode is ended. If the maximum authenticable number has not been reached, the host device generates and sends an inquiry signal (step S133). In this inquiry signal to be sent, a provisional character string is set as an ESSID, no WEP key (Wired Equivalent Privacy Key) is set, and a channel is set to "1". The function device determines whether it has received the inquiry signal (step S233). If the function device has not received the inquiry signal, the function device ends the authentication process.

If the function device has received the inquiry signal, the function device generates an inquiry response including individual information (for example, a MAC address) of the function device and sends it to the host device (step S234). In this inquiry response to be sent, a provisional character string is set as an ESSID, no WEP key is set, and a channel is set to "1". The inquiry signal and the inquiry response received/sent between the host device and the function device in step S133 and step S234 may be subjected to an encryption/decryption process with an encryption key which is prescribed in the host and function devices.

The host device determines whether it has received a response to the inquiry (step S134). If the host device has not received a response to the inquiry response within a predetermined time period after sending the inquiry signal, the host device ends the authentication process. If the host device has received a response to the inquiry, the host device analyzes the response to obtain the individual information of the specific function device (step S135). Then, the host device sets shared authentication information based on the individual information of the specific function device and the host device and stores it, as well as sets an access condition to the specific function device (step S136). The access condition includes an access restriction of counting the number, such as the number of printing sheets or the number of times to accept command, permissible for the specific function device. In addition, the access condition may include an access restriction of counting time, for example limiting the time period in which the authentication of the specific function device is permitted after setting and storing the authentication information.

After setting and storing the shared authentication information with the specific function device, the host device sends the shared authentication information (step S137). The function device determines whether it has received the shared authentication information from the specific host device (step S235). If the function device has not received the shared authentication information, the function device ends the authentication process.

If the function device has received the shared authentication information, the function device stores the shared authentication information with the above described specific host device (step S236) and registers the specific host device as an option of the wireless data communication connection partner (step S237). Thereafter, the function device increments the number of authenticated device/devices by 1 (step S238) and notifies the specific host device of authentication completion (step S239). Upon being notified of the authentication completion from the specific function device in this way, the host device registers the specific function device as an option of the wireless data communication connection partner (step S138). Thereafter, the host device increments the number of authenticated device/devices by 1 (step S139) and notifies the specific function device of authentication completion (step S140) and then ends the wireless authentication process. Upon being notified of the authentication completion from the specific host device, the function device ends the wireless authentication process. The shared authentication information includes an ESSID, a WEP key and a channel which are communication parameters and identifier codes in an ad hoc mode in IEEE 802.11b and wireless data communication is thereafter performed based on this authentication information.

Figure 17:
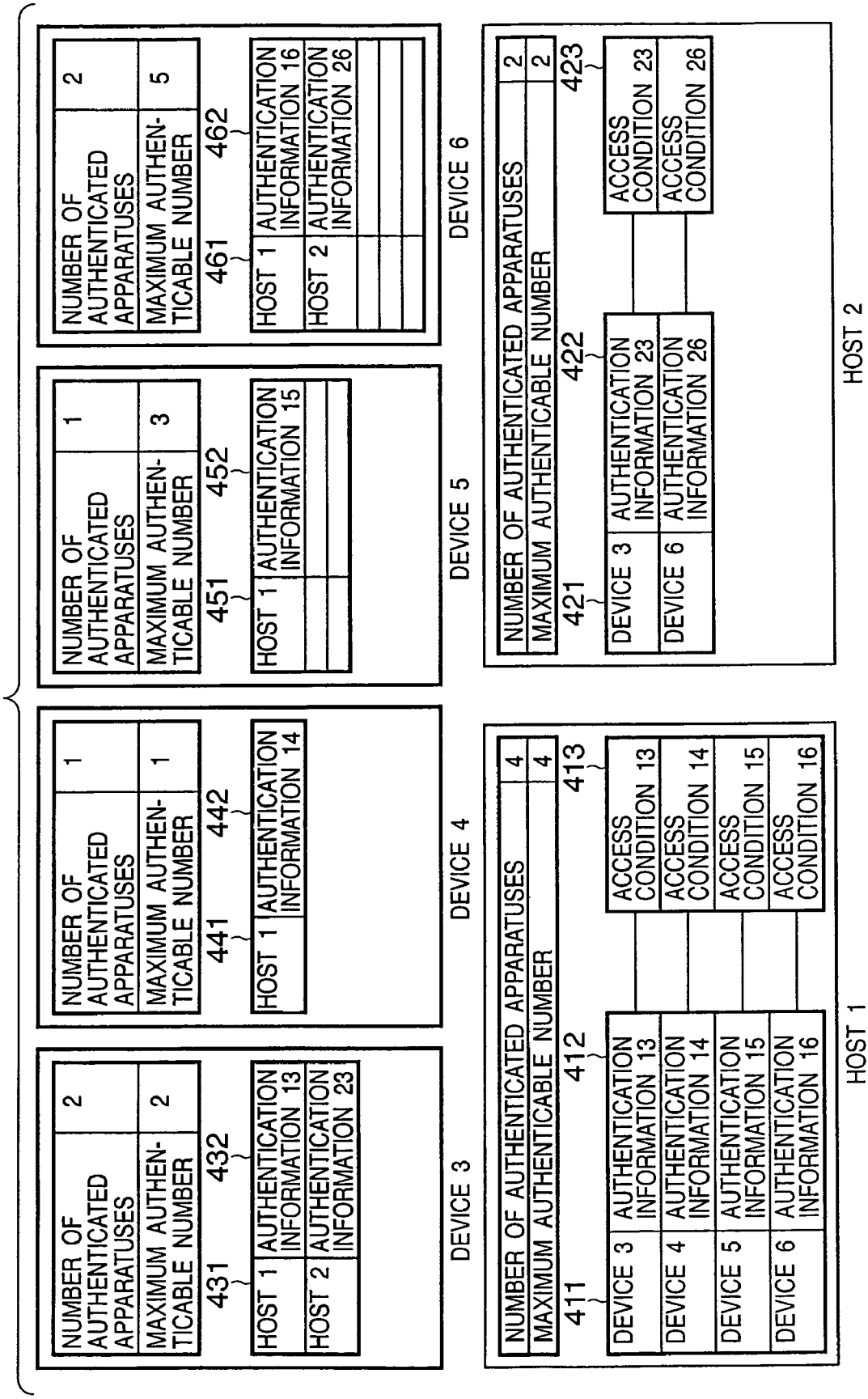
FIG. 17 is a view showing an example of information stored in the authentication information storing areas after the process of setting and storing mutual authentication information according to the embodiment of the present invention.

FIG. 17 is a conceptual view showing an example of information stored in the authentication information storing areas after the process of setting and storing the shared authentication information shown in the flowchart in FIG. 15.

In the example shown in FIG. 17, in the authentication information storing area 432 of the device 3, shared authentication information 13 with the host 1 and shared authentication information 23 with the host 2 are stored, and in the connection partner storing area 431, the host 1 and the host 2 are registered as options of the wireless data communication connection partners. In the authentication information storing area 442 of the device 4, shared authentication information 14 with the host 1 is stored, and in the connection partner storing area 441, the host 1 is registered as an option of the wireless data communication connection partner. In the authentication information storing area 452 of the device 5, shared authentication information 15 with the host 1 is stored, and in the connection partner storing area 451, the host 1 is registered as an option of the wireless data communication connection partner. Because the maximum authenticable number of the device 5 is 3, the device 5 can authenticate two more host devices. In the authentication information storing area 462 of the device 6, shared authentication information 16 with the host 1 and shared authentication information 26 with the host 2 are stored, and in the connection partner storing area 461, the host 1 and the host 2 are registered as options of the wireless data communication connection partners. Because the maximum authenticable number of the device 6 is 5, the device 6 can authenticate three more host devices.

Further, because the host 1 has mutually authenticated with the devices 3, 4, 5 and 6, shared authentication information 13, 14, 15 and 16 with the devices 3, 4, 5 and 6 are set and stored in the authentication information storing area 412 of the host 1. In addition, in the connection partner storing area 411, the devices 3, 4, 5 and 6 are registered as options of the wireless data communication connection partners, and in the access condition storing area 413, access conditions 13, 14, 15 and 16 related to the respective devices are set. In the same manner, because the host 2 has mutually authenticated with the devices 3 and 6, shared authentication information 23 and 26 with the devices 3 and 6 are set and stored in the authentication information storing area 422 of the host 2. In addition, in the connection partner storing area 421, the devices 3 and 6 are registered as options of the wireless data communication connection partners, and in the access condition storing area 423, access conditions 23 and 26 related to the respective devices are set.

The case has been described in which all authentication information stored in the authentication information storing areas are registered by the process in FIG. 8 or FIG. 11 in respect of FIG. 14 and by the process in FIG. 15 in respect of FIG. 17. However, the present invention is not limited to the case, the methods shown in FIG. 8, FIG. 11 and FIG. 15 may be selectively used in registering the authentication information, as required. In such a case, information as shown in FIG. 14 and FIG. 17 are stored in the authentication information storing area in a mixed manner.

Next, a process of performing wireless data communication between the host device and the function device will be described.

Figure 18:
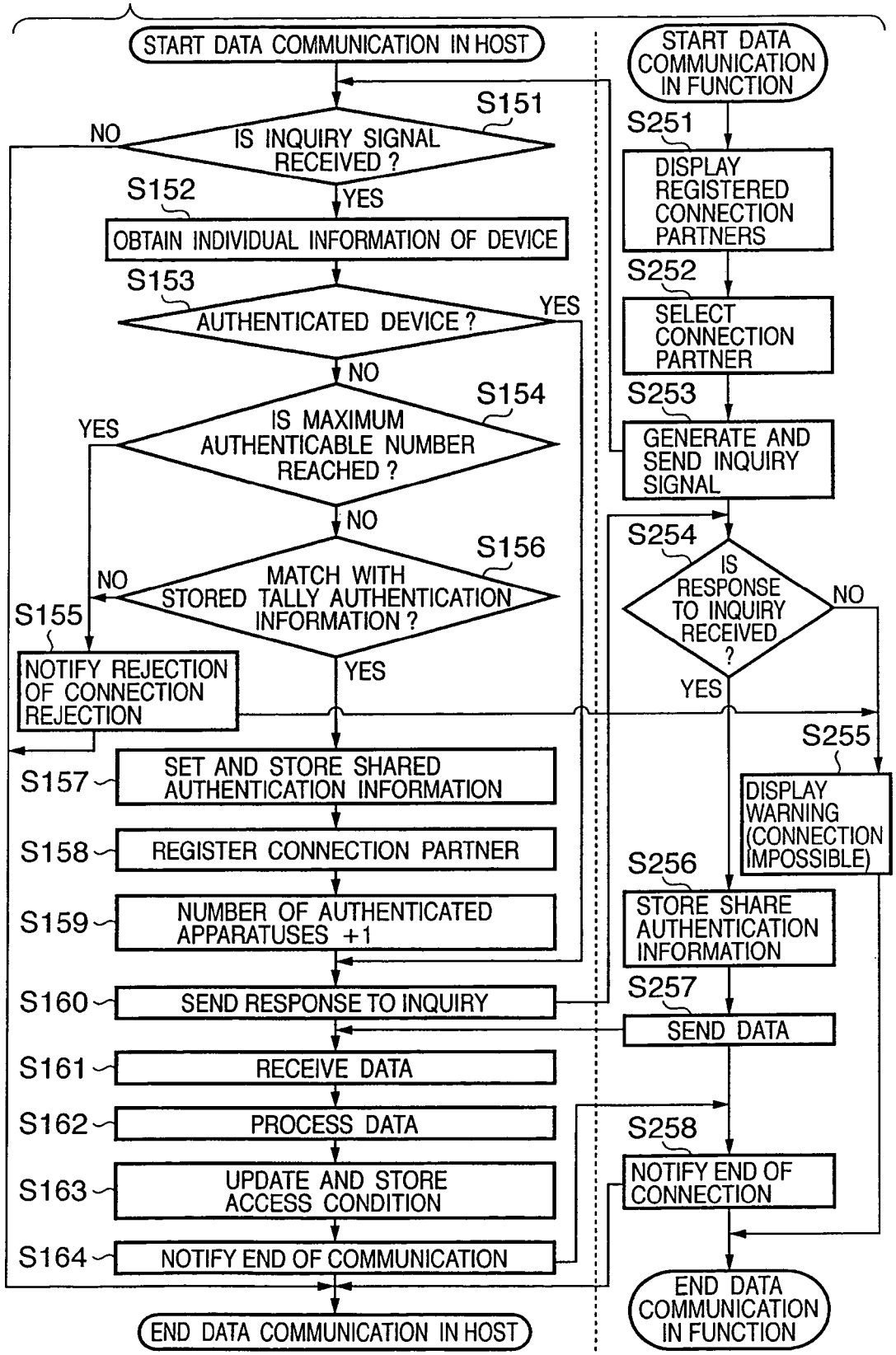
FIG. 18 is a flowchart showing, in parallel, a procedure for performing wireless data communication between the wireless communication host device and wireless communication function device according to the embodiment of the present invention.
Figure 19:
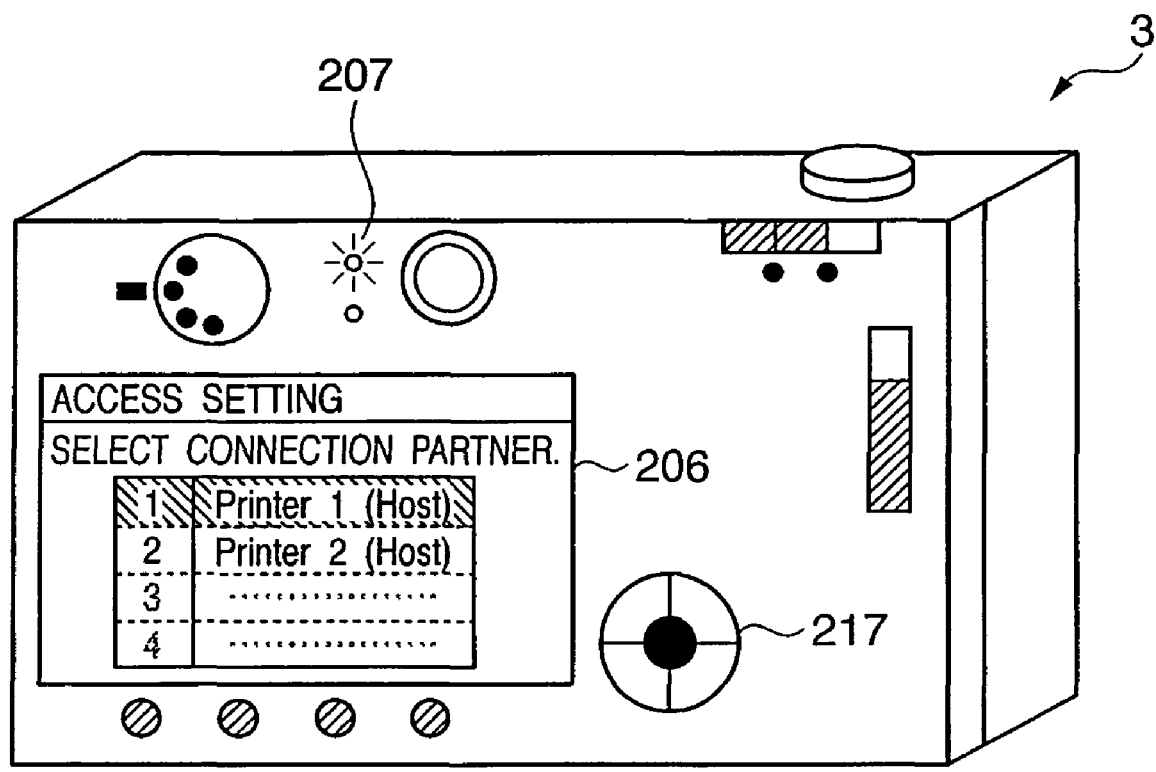
FIG. 19 is a view showing an example of user interface display for selecting wireless data communication connection partner in the wireless communication function device according to the embodiment of the present invention.

FIG. 18 is a flowchart showing, in parallel, a process of performing wireless data communication between the host device and the function device in response to a request from the function device. In addition, FIG. 19 is a view showing an example of user interface of the device 3 displayed as one example in performing wireless data communication process shown in FIG. 18.

First, the operation key 217 of the function device is operated to display a list of the host device (step S251). Here, the list of the host devices, which are already registered as options of the wireless data communication partners in the connection partner storing area 431 of the device 3 as shown in FIG. 14 or FIG. 17, is displayed in the user interface of device 3 as shown in FIG. 19. Then, a host device is selected to be the wireless data communication connection partner (step S252). At the time of selecting the host device which will be the wireless data communication connection partner, the function device generates an inquiry signal and sends the inquiry signal to the specific host device (step S253). The inquiry signal to be sent in step S253 is generated based on the tally authentication information or shared authentication information with the specific host device which is stored in the authentication information storing area 432 and the individual information (for example, a MAC address) of the function device. The inquiry signal may be subjected to an encryption/decryption process with an encryption key which is generated based on the tally authentication information or shared authentication information stored in the host device and the function device.

The host device determines whether it has received the inquiry signal (step S151) If the host device has not received the inquiry signal, the host device ends the data communication process. If the host device has received the inquiry signal, the host device analyzes the inquiry signal. Then, the host device obtains the individual information and the tally authentication information or shared authentication information of the specific function device included in the inquiry signal and determines whether the function device is already authenticated or not (step S153). The semi-authenticated state is regarded as not-authenticated. If the function device is already authenticated, the host device sends a response to the inquiry to the specific function device (step S160).

If the function device is not already authenticated, the host device determines whether the maximum authenticable number is reached (step S154). If the maximum authenticable number is reached, the host device notifies the function device of rejection of connection (step S155) and ends the data communication process. It should noted that in the determination of "whether the maximum authenticable number is reached" in step S154, it is determined whether the number of the function devices in the fully authenticated state reaches the maximum authenticable number or not, in contrast to the determination of whether the maximum authenticable number is reached in FIG. 8, FIG. 11 and FIG. 15. With the semi-authenticated state, it is regarded as "the maximum authenticable number has not been reached".

If the maximum authenticable number has not been reached, it is determined whether the tally authentication information included in the inquiry signal received in step S151 matches with the tally authentication information which is already set in the host device (step S156). If the tally authentication information does not match as the result of the determination, the host device notifies the function device of rejection of connection (step S155) and ends the data communication process.

Figure 20A:
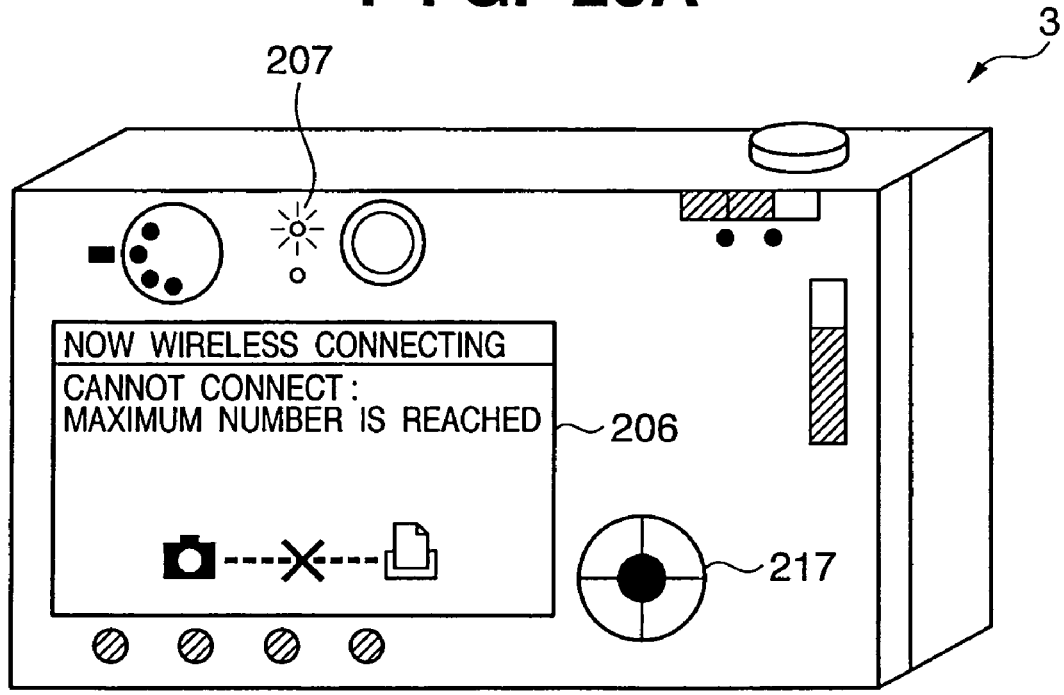
FIGS. 20A and 20B are views showing examples of user interface display displayed on the wireless communication function device, if establishment of a wireless data communication path is failed between the wireless communication host device and the wireless communication function device according to the embodiment of the present invention.
Figure 20B:
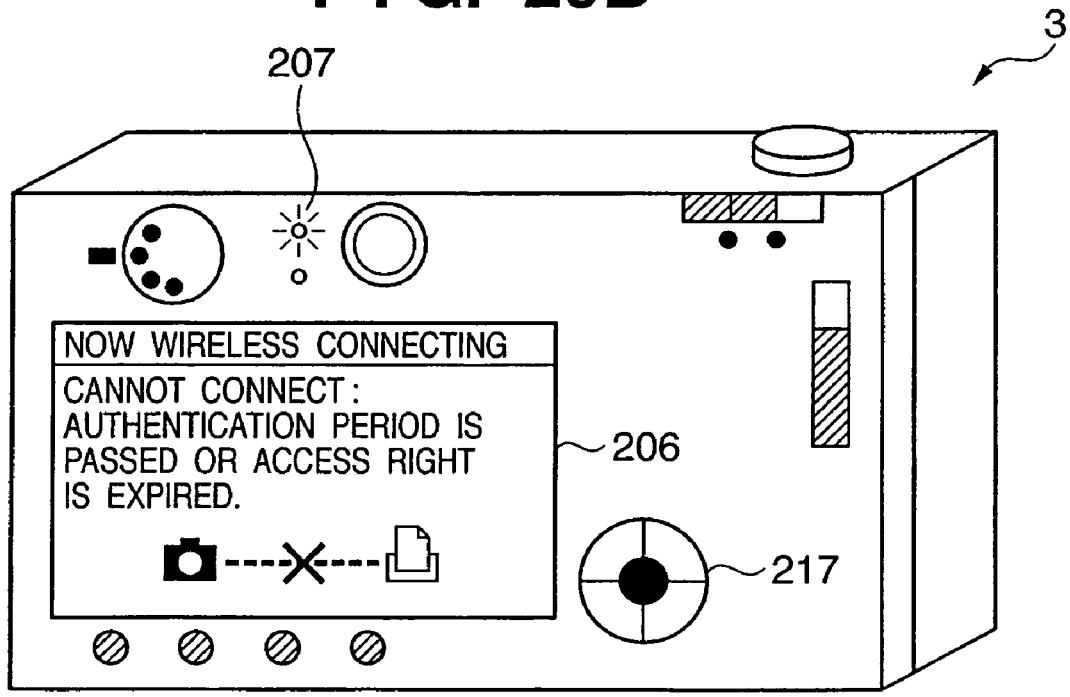

FIGS. 20A and 20B show examples of user interface displayed on the function device in step S255, when it is determined that the maximum authenticable number is reached in step S154 and when it is determined that the tally authentication information does not match in step S156, respectively. In the user interface, a message of reason for warning or icons of the host and function devices may be displayed.

If the tally authentication information included in the inquiry signal received in step S151 matches with the tally authentication information which is already set in the host device, the host device sets and stores the shared authentication information and sets an access condition for the specific function device (step S157). Further, the host device registers the specific function device as an option of the wireless data communication connection partner in the connection partner storing area (step S158) and increments the number of authenticated device/devices by 1 (step S159). Then, the host device sends to the function device a response to the inquiry including the shared authentication information with the specific device (step S160). The specific function device determines whether it has received the response to the inquiry (step S254). If the function device has not received the inquiry response within the predetermined time period after sending the inquiry signal, the function device displays a warning indicating that connection is impossible (step S255) and ends the data communication process.

Upon receiving the response to the inquiry, the function device stores the shared authentication information for the specific host device which is included in the response to the inquiry (step S256). In the data communication process in the case of the shared authentication information being already stored in the specific host device and function device, step S256 may be omitted because the authentication process is performed with the already stored shared authentication information.

In step S160, the response to the inquiry sent/received between the host device and the function device may be subjected to an encryption/decryption process with an encryption key which is generated based on the shared authentication information and the tally authentication information stored in the host device and function device. Further, if the function device is notified of rejection of connection from the specific host device in step S155, the function device determines that the authentication information of the specific host device stored in the authentication information storing area of the function device is invalid and the function device may perform a process of deleting the tally authentication information of the specific host device and the specific host device registered as an option of the wireless data communication connection partner, from the authentication information storing area.

At the time when step S256 is completed, both tally authentication information of the specific host device and the specific function device complement with each other to be set and stored as shared authentication information, thereby a wireless data communication path is established. In addition, at the time when step S256 is completed, the authentication information storing areas of the host device and the function device are similar to the example shown in FIG. 17. The shared authentication information stored in the specific host device and the specific function device includes an ESSID, a WEP key and a channel, which are communication parameters and identifier codes in an ad hoc mode in IEEE 802.11b. Wireless data communication is thereafter performed based on this authentication information.

After receiving the response to the inquiry from the specific host device and storing the shared authentication information for the specific host device, the function device starts sending data (step S257). In sending data, the function device sends data such as digital image data stored in a storage medium inserted in the memory socket 209 to the specific host device.

The specific host device receives the data (step S161), the image processing unit 104 converts the digital image data or the like into printable digital data, and the printer engine 121 performs data processing such as printing of the digital data (step S162). After the data processing is completed, the host device updates and stores the access condition for the specific function device stored in the access condition storing area in the authentication information storing area (step S163) and notifies the specific function device of the end of the communication (step S164). Upon notified of the end of the communication from the specific host device, the function device notifies the specific host device of the end of the communication (step S258). The host and function devices, which are notified of the end of the communication, end the data communication.

As described above, according to this embodiment, it is possible to prevent unauthorized access and buildup of unnecessary authentication information by individually setting the maximum authenticable number for each wireless communication apparatus.

If too many communication apparatuses are allowed to communicate, the occupation time by these communication apparatuses becomes too long. This problem can be resolved by limiting the number of apparatuses which can be authenticated at the same time.

Additionally, as described above with reference to FIGS. 8 and 11, this embodiment includes the semi-authenticated state in which the tally authentication information is stored and the complete authenticated state in which the shared authentication information is stored in steps S154 to S160 and steps S254 and S256 in FIG. 15 or FIG. 18. Thereby, even under a condition in which a plurality of host and function devices are mixed, it is possible to easily perform high-security authentication.

In other words, according to this embodiment, a process of mutually authenticating the connection partners by the wireless communication apparatuses can be performed without wired connection and manual inputting of the authentication information, which is effective to simplify the authentication process. In addition, because management of the authentication information after the authenticating process between the wireless communication apparatuses is performed under a condition previously prescribed in the system, buildup of unnecessary authentication information can be prevented. Further, because wireless data communication between the wireless communication apparatuses is performed based on the authentication information, it is possible to easily establish a wireless data communication path with a desired wireless communication apparatus and control communication between the wireless communication apparatuses, even under the condition in which a plurality of authenticated wireless communication apparatuses are mixed. Still further, it is possible to provide high-security wireless communication system and service.

Other Embodiments

Although, in this embodiment, a printing apparatus as a host device and a digital camera as a function device have been described, the present invention is not limited to these apparatuses. Any apparatuses may be used as long as each apparatus can individually set maximum authenticable number and the apparatus serving as the host device issues tally authentication information and the apparatus serving as the function device stores the tally authentication information, and further the apparatuses can store shared authentication information for both apparatuses when a wireless data communication path between them is established. Therefore, an apparatus which has both a display unit and an image sensing unit, such as a digital camera, can be either of the host device and the function device. Further, in this embodiment, it is possible to store the shared authentication information for both apparatuses with wireless communication. Therefore, according to the method, home electric appliances and accessories or the like which have no display unit or capturing unit may be the host device or the function device.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

When the present invention is applied to the storage medium, a program code relating to the flowchart shown in FIG. 8, 11 or 18 described above is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-293001, filed Oct. 5, 2005, which is hereby incorporated by reference herein in its entirety.

What is claimed is:

1. An authentication method in a plurality of wireless communication apparatuses which communicate with each other and which include a first wireless communication apparatus and a second wireless communication apparatus, the method comprising the steps of:

setting a maximum number of one or more other wireless communication apparatuses up to which each wireless communication apparatus authenticates;

storing the set maximum number in each wireless communication apparatus; and authenticating the one or more wireless communication apparatuses within the stored maximum number, wherein the one or more wireless communication apparatuses are authenticated by:

determining whether a number of authenticated apparatuses is less than the maximum number in each of the first and second wireless communication apparatuses, and if it is determined that the number of authenticated apparatuses is less than the maximum number in both the first and second wireless communication apparatuses, performing the steps of:

storing individual information of the first wireless communication apparatus as semi-authentication information and converting the semi-authentication information into code information to visualize in the first wireless communication apparatus;

capturing the visualized code information in the second wireless communication apparatus;

analyzing the captured code information to obtain the semi-authentication information in the second wireless communication apparatus; and storing the analyzed and obtained semi-authentication information in the second wireless communication apparatus.

2. The authentication method according to claim 1, wherein the first wireless communication apparatus displays the code information.

3. The authentication method according to claim 1, wherein the first wireless communication apparatus prints the code information.

4. The authentication method according to claim 1, wherein the first wireless communication apparatus deletes the semi-authentication information when a preset time is elapsed after storing the semi-authentication information.

5. The authentication method according to claim 1, wherein the authentication step further comprises:

receiving, in the first wireless communication apparatus, the semi-authentication information from the second wireless communication apparatus;

setting shared authentication information via wireless communication in the first wireless communication apparatus if the received semi-authentication information corresponds to the stored semi-authentication information; and storing the set shared authentication information in each of the first and second wireless communication apparatuses.

6. A computer-readable storage medium readable by an information processing apparatus, wherein the storage medium stores a program which is executed by the information processing apparatus, the program having program codes for realizing the authentication method according to claim 1.

7. A wireless communication system comprising a plurality of wireless communication apparatuses which communicate with each other and which include a first wireless communication apparatus and a second wireless communication apparatus, wherein each wireless communication apparatus comprises:

a setting unit constructed to set a maximum number of one or more other wireless communication apparatuses up to which each wireless communication apparatus authenticates;

a first storage unit constructed to store the set maximum number in each wireless communication apparatus; and an authentication unit constructed to authenticate the one or more wireless communication apparatuses within the stored maximum number, wherein the authentication unit comprises:

a determination unit constructed to determine whether a number of authenticated apparatuses is less than the maximum number in each of the first and second wireless communication apparatuses;

a second storage unit constructed to store individual information of the first wireless communication apparatus as semi-authentication information and to convert the semi-authentication information into code information to visualize in the first wireless communication apparatus, if it is determined that the number of authenticated apparatuses is less than the maximum number in both the first and second wireless communication apparatuses;

a capture unit constructed to capture the visualized code information in the second wireless communication apparatus, if it is determined that the number of authenticated apparatuses is less than the maximum number in both the first and second wireless communication apparatuses;

an analysis unit constructed to analyze the captured code information to obtain the semi-authentication information in the second wireless communication apparatus, if it is determined that the number of authenticated apparatuses is less than the maximum number in both the first and second wireless communication apparatuses; and a third storage unit constructed to store the analyzed and obtained semi-authentication information in the second wireless communication apparatus, if it is determined that the number of authenticated apparatuses is less than the maximum number in both the first and second wireless communication apparatuses.

* * * * *